US005550767A

United States Patent [19]
Taborn et al.

[11] Patent Number: 5,550,767
[45] Date of Patent: Aug. 27, 1996

[54] METHOD AND APPARATUS FOR DETECTING UNDERFLOW AND OVERFLOW

[75] Inventors: Michael P. Taborn; John K. Yuan, both of Austin, Tex.

[73] Assignee: IBM Corporation, Armonk, N.Y.

[21] Appl. No.: 323,483

[22] Filed: Oct. 14, 1994

[51] Int. Cl.⁶ ............................. G06F 7/00; G06F 7/38
[52] U.S. Cl. .................. 364/745; 364/715.04; 364/748
[58] Field of Search ........................ 364/715.04, 736, 364/736.5, 745, 748

[56] References Cited

U.S. PATENT DOCUMENTS

| | | | |
|---|---|---|---|
| 4,562,553 | 12/1985 | Mattedi et al. | 364/745 |
| 5,027,308 | 6/1991 | Sit et al. | 364/748 |
| 5,058,048 | 10/1991 | Gupta et al. | 364/748 |
| 5,187,678 | 2/1993 | Hori | 364/748 |
| 5,237,667 | 8/1993 | Murakami et al. | 395/375 |
| 5,267,186 | 11/1993 | Gupta et al. | 364/748 |
| 5,272,660 | 12/1993 | Rossbach | 364/748 |
| 5,303,175 | 4/1994 | Suzuki | 364/748 |

OTHER PUBLICATIONS

IBM Technical Disclosure Bulletin: vol. 31 No. 3 Aug. 1988 Implementation of Binary Floating Point Architecture to Enable Efficient Emulation of Single and Double Precision Arithmetic.
IBM Technical Disclosure Bulletin: vol. 32 No. 3A Aug. 1989 Easy Baised Exponent Handling VIA 2's Complement Arithmetic.
IBM Technical Disclosure Bulletin: vol. 33 No. 4 Sep. 1990 Device Tomake Ultra Small Diameter VIAS In PC Cards, pp. 248–249.
Debugging one Job From Another Job pp. 245–247.
New Negative Photoresist Process, pp. 243–244.
IBM Technical Disclosure Bulletin: vol. 33 No. 9 Feb. 1991 Floating Point Exception Handling (Denormalization).
IBM Technical Disclosure Bulletin: vol. 35 No. 4A Sep. 1992 Early Exception Detection on Store with Convert.
IBM Technical Disclosure Bulletin: vol. 36 No. 03 Mar. 1993 Hardware Instuction Generation.
Elliott, et al., "Single Cycle/Writeback Cycle Floating Point Denormalization", Apr. 1994, 315–318, *IBM Technical Disclosure Bulletin* .
Chu, et al., "Divide Early Out for the Floating Point" Oct. 1992, 76–77, *IBM Technical Disclosure Bulletin* .
Chu, et al., "Early Sticky Calculation for this Floating Point", *IBM Technical Disclosure Bulletin,* Dec. 1991 pp. 220–223.

*Primary Examiner*—Roy N. Envall, Jr.
*Assistant Examiner*—Chuong D. Ngo
*Attorney, Agent, or Firm*—Donald R. Comuzzi; Christopher L. Makay; James E. Ruland

[57] ABSTRACT

An underflow/overflow detector includes first circuitry that decodes an exponent into an exponent shift value and compares the exponent shift value with a normalize shift value to determine whether an underflow or overflow error will occur. The underflow overflow detector further includes second circuitry that compares the exponent to a maximum and minimum exponent value to determine whether an underflow or overflow error will occur.

21 Claims, 6 Drawing Sheets

METHOD AND APPARATUS FOR DETECTING UNDERFLOW AND OVERFLOW

BACKGROUND OF THE INVENTION

1. Field of the Invention

The present invention relates to floating point units and, more particularly, but not by way of limitation, to a method and apparatus for detecting underflow and overflow.

2. Description of the Related Art

When implementing the ANSI/IEEE standard 754-1985, typical floating point units include circuits configured such that they sequentially: 1) perform a desired arithmetic operation on a first and second operand, 2) normalize the mantissa of the result, 3) adjust the exponent of the result, 4) determine if an underflow or overflow will occur due to the adjustment of the exponent, and 5) if no underflow or overflow will occur, modify both the mantissa and exponent to produce a floating point number conforming to the IEEE standard.

The normalization circuitry typically includes a shift register that shifts the mantissa resulting from the arithmetic operation either left or right within the mantissa bit field until the bit to the left of the decimal point is non-zero. Each shift of the mantissa to the left requires the exponent to decrease by a value of one. Conversely, each shift of the mantissa to the right requires the exponent to increase by a value of one. Additionally, the shift register calculates an offset amount associated with the shift value.

The exponent adjustment circuitry includes an arithmetic logic unit (ALU) that inputs an exponent from one of the operands and the offset determined by the normalize circuitry to adjust the exponent for the answer. Thus, the exponent of the operand input into the ALU provides a base exponent from which to determine the exponent of the final number.

The underflow/overflow circuitry includes a comparator that receives from the ALU the exponent created according to the offset value. The comparator compares the resulting exponent value with the maximum and minimum exponent values allowable in the exponent bit field. If the resulting exponent value is between the maximum and minimum values, the comparator outputs a signal to the modify circuitry that results in the modify circuitry conforming the shifted mantissa and adjusted exponent to the IEEE standard and outputting the conformed result. However, if the resulting exponent is smaller than the minimum exponent value, the comparator provides a flag signaling an underflow. Similarly, if the resulting exponent is greater than the maximum exponent value, the comparator produces a flag signaling an overflow.

Although the above underflow/overflow detection scheme operates adequately, it suffers from the disadvantage of slowing the operation of floating point units. The use of comparator circuitry in a separate step increases the time necessary to complete an arithmetic operation by at least one clock cycle for each operation performed. Thus, because floating point units iteratively perform multiple operations, the comparator circuitry significantly increases the time required to complete a series of operations.

The separate step of underflow/overflow detection not only undesirably slows floating point unit performance, but it also precludes the use of such floating point units with high speed circuitry. For example, circuitry operating at high frequencies would require a result from a floating point unit at a time before an operation has been finished. That is, the additional clock cycles required to perform the extra underflow/overflow detection step slows the floating point unit to a level where it cannot perform arithmetic operations fast enough to satisfy the demands of high speed circuitry.

Accordingly, circuitry that eliminates the separate step of underflow/overflow detection would significantly increase the speed of any floating point unit so that it could be utilized with high speed circuitry.

SUMMARY OF THE INVENTION

In accordance with the present invention, an underflow/overflow detector includes first circuitry that decodes an exponent into an exponent shift value and compares the exponent shift value with a normalize shift value to determine whether an underflow or overflow error will occur. The underflow overflow detector further includes second circuitry that compares the exponent to a maximum and minimum exponent value to determine whether an underflow or overflow error will occur.

It is, therefore, an object of the present invention to provide an underflow/overflow detector that compares an exponent shift value to a normalize shift value to determine if underflow or It is another object of the present invention to provide an underflow/overflow detector that compares an exponent to a maximum and minimum exponent value to determine if underflow or overflow will occur.

Still other objects, features, and advantages of the present invention will become evident to those skilled in the art in light of the following.

DETAILED DESCRIPTION OF THE PREFERRED EMBODIMENT

An illustrative embodiment of the present invention and its advantages are better understood by referring to FIGS. 1–7 of the drawings, like numerals being used for like and corresponding parts of the accompanying drawings. In FIGS. 1–4 although all information paths are shown with a single line, each information path transfers multiple bits of information. Likewise, the components of execution flow 5 and underflow/overflow detector 10 operate in response to multiple bits of information unless otherwise specified.

Figure 1:
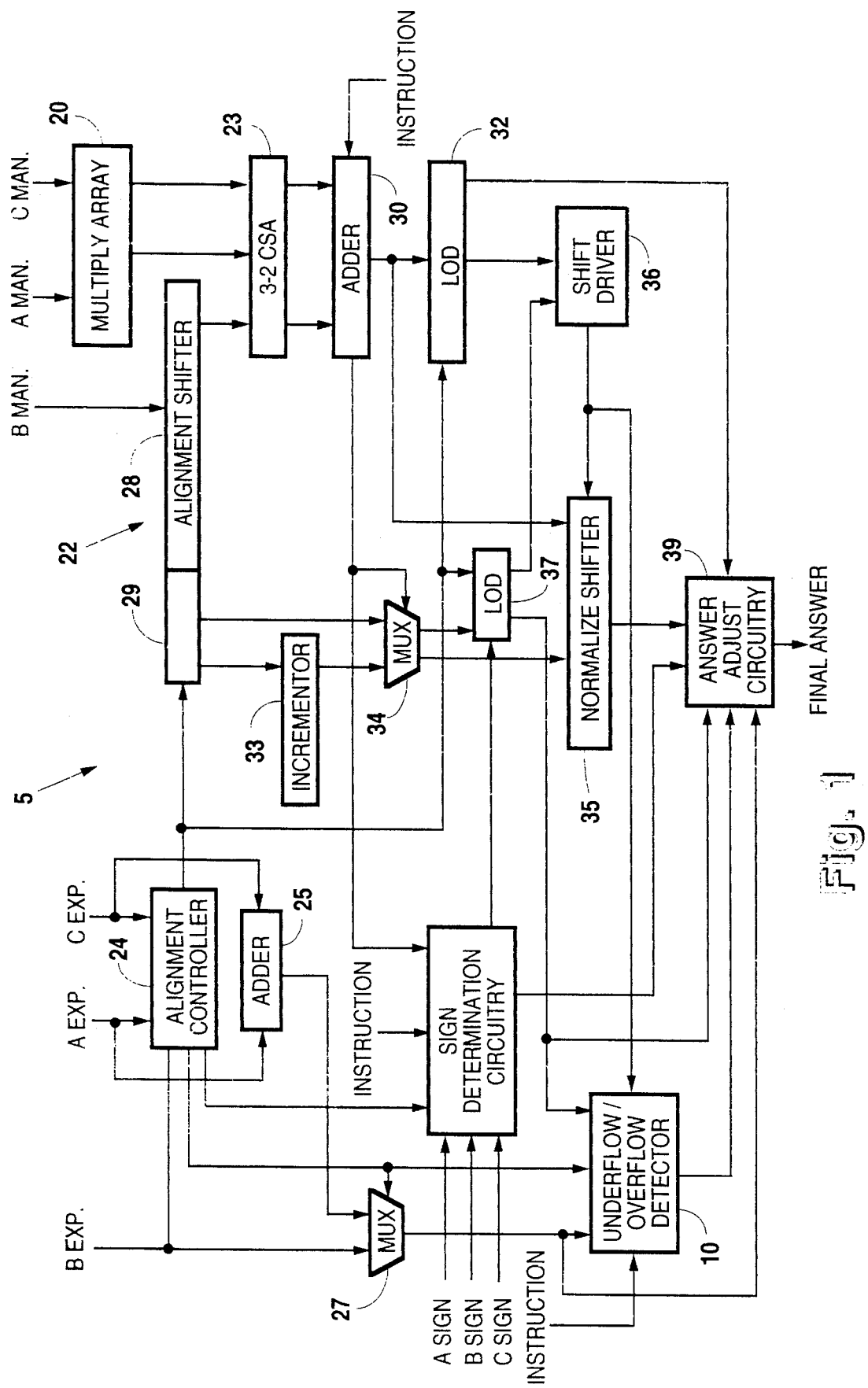
FIG. 1 is a block diagram illustrating an example implementation of the underflow/overflow detector in the execution flow of a floating point unit.

FIG. 1 illustrates an execution flow 5 of a floating point unit which includes underflow/overflow detector 10 according to this preferred embodiment. The following description of flow 5 and the implementation of underflow/overflow detector 10 therein is for the purpose of disclosure and to aid in the understanding of the invention. Those skilled in the art will recognize that underflow/overflow detector 10 may be implemented in any floating point unit because an implementation of a floating point unit has to develop the signals input into underflow/overflow detector 10 regardless of whether the floating point unit includes underflow/overflow detector 10.

As shown in FIG. 1, the floating point unit performs a multiplication between an A and a C operand followed by the addition of a B operand to or the subtraction of a B operand from the result of the multiplication between the A and C operands. The execution flow 5 can be used to perform arithmetic operations other than aforementioned multiplication-addition(subtraction) operation. Illustratively, many arithmetic operations such as division or square root may be executed as a series of subtractions, multiplications, and additions. Particularly, division between two operands may be approximated by a Taylor series expansion formulated by iteratively executing a series of subtractions, multiplications, and additions.

Any floating point unit implementing flow 5 includes a controller (not shown) that outputs to flow 5 an instruction (e.g., add or subtract) and the operands required to execute the instruction. After executing the instruction, the floating point unit controller directs flow 5 to output the answer to an answer register (not shown). If the instruction is one in a series of instructions to approximate an arithmetic operation (e.g., division or square root) the answer output from flow 5 is an intermediate answer re-input into flow 5 by the floating point unit controller as an operand for a following instruction of the instruction series. At the end of the instruction series, the floating point unit controller directs flow 5 to output the answer to the answer register.

Flow 5 includes Booth encoded Wallace tree multiply array 20. Multiply array 20 does not require the input of an instruction from the floating point controller. Once multiply array 20 receives the mantissa of an A operand (hereinafter referred to as the A mantissa) and the mantissa of a C operand (hereinafter referred to as the C mantissa), it inputs the A and C mantissas and multiplies them to produce a carry and sum that it outputs separately to 3-2 carry-save-add (CSA) 23. If only addition is required of flow 5, the floating point unit controller outputs a C operand equaling one so that multiply array 20 outputs the A mantissa to 3-2 CSA 23.

Flow 5 includes alignment controller 24 to control the addition of a B operand to or the subtraction of a B operand from the product of the A operand and C operand (hereinafter referred to as the AC operand). Alignment controller 24 develops the control signals necessary to align the B operand with the AC operand. Alignment control 24 inputs the A exponent and C exponent and adds those exponents together to determine the value of the AC exponent. After determining the AC exponent, alignment controller 24 inputs the B exponent and compares the B exponent with the AC exponent to determine whether the B exponent is greater than or equal to the AC exponent. The difference in magnitude between the B exponent and the AC exponent corresponds to the shift value (i.e., the number of shifts required to align the B mantissa with the AC result such that the B exponent equals the AC exponent). After calculating the shift value, alignment controller outputs a shift control signal that actuates alignment shifter 22 to shift the B mantissa the appropriate number of bits. Alignment shifter 22 inputs the B mantissa with the most significant bit (i.e., far left bit) of the B mantissa aligned with its most significant bit to provide a reference that allows alignment controller 24 to calculate the appropriate shift value.

In this preferred embodiment, alignment shifter 22 includes a total of 160 bits and is separated into MADDRANGE (multiplication add) bit field 28 and B-path bit field 29. MADDRANGE bit field 28 includes a number of bits equal to the maximum number of bits in the result output from adder 30. Thus, MADDRANGE bit field 28 includes 106 bits, while B-path bit field 29 includes the remaining 54 bits of alignment shifter 22.

Alignment controller 24 controls alignment shifter 22 to shift the B mantissa stored therein the appropriate number of bits to the right until the B exponent equals the AC exponent. If the B exponent is less than the AC exponent, it is possible that bits of the B mantissa will be shifted beyond MADDRANGE bit field 22. Any bits of the B mantissa shifted beyond MADDRANGE field 28 are not discarded but are saved in a register (not shown) as sticky bits. Sticky bits are utilized in adjusting the answer output from flow 5, however, sticky bits are not utilized by underflow/overflow detector 10 and, therefore, will not be discussed. Alternatively, if the B exponent is greater than the AC exponent, then bits of the B mantissa may remain within B-path bit field 29 (hereinafter referred to a B-path bits). Any B-path bits will remain stored in B-path bit field 29 of alignment shifter 22 until utilized by flow 5 in calculating the mantissa resulting from the operation of A*C+B.

Flow 5 includes adder 25 to input the A exponent and C exponent and add those exponents together to produce the AC exponent. Flow 5 includes multiplexer 27 to permit the selection of either the B exponent or the AC exponent for output to answer adjust circuitry 39 to supply the appropriate exponent for the answer. Alignment controller 24 connects to multiplexer 27 via select lines that allow alignment controller 24 to activate multiplexer 27 to pass either the B exponent or the AC exponent calculated by adder 25. If alignment controller 24 determines the B exponent is greater than or equal to the AC exponent then it triggers multiplexer 27 to output the B exponent to answer adjust circuitry 39. Alternatively, if the B exponent is less than the AC exponent, alignment controller 24 triggers multiplexer 27 to output the AC exponent to answer adjust circuitry 39. Furthermore, the multiplexer control signal and the output from multiplexer 27 in response to that control signal are input into underflow/overflow detector 10. Underflow/overflow detector 10 utilizes both the control signal and the output of either the B exponent or the AC exponent from multiplexer 27 in the determination of an underflow or overflow error (described herein).

Flow 5 includes 3-2 carry-save-add (CSA) 23 to input the carry and sum output from multiply array 20 and the bits of the B mantissa contained within MADDRANGE bit field 28 (hereinafter referred to as the MADDRANGE bits) and compress those three inputs into a carry and sum output. Although the MADDRANGE bit field will be referred to as including 106 bits herein, the output of the multiply array is 212 bits sent to the 106 CSA's and combined with the B mantissa contained within MADDRANGE bit field 28. If only multiplication is required of flow 5, the B operand is set to 0 so that multiply array 20 outputs the AC result to 3-2 CSA 23.

Flow 5 includes adder 30 to perform an addition or subtraction on the carry and sum output from 3-2 CSA 23.

If the instruction input into adder 30 from the floating point unit controller is an add, adder 30 inputs the carry and sum output from 3-2 CSA 23 and adds that carry and sum output to form a result for the operation of the AC result plus the MADDRANGE bits. Conversely, if the instruction input into adder 30 from the floating point unit controller is a subtract, the MADDRANGE bits are complemented prior to input into 3-2 CSA 23. When adder 30 produces a carry during the performance of either an add or subtract, it outputs a carry signal to multiplexer 34 and sign determination circuitry 38.

Flow 5 includes sign determination circuitry 38 to ascertain the sign of the answer output from flow 5. Sign determination circuitry 38 inputs from the floating point unit controller the instruction and the sign signal indicating the result of the comparison between the B exponent and the AC exponent. Sign determination circuitry 38 further inputs a carry signal from adder 30 and the A, B, and C signs input into flow 5 by the floating point unit controller. Sign determination circuitry 38 examines the instruction; the A, B, and C signs; the carry signal; and the sign signal output from alignment controller 24 to determine the sign for the answer accordingly.

Flow 5 includes multiplexer 34, normalize shifter 35, and incrementor 36 to perform any necessary modification of the output from adder 30. After adder 30 completes the addition of the carry and sum, normalize shifter 35 inputs the output of adder 30 with the least significant bit (i.e. the far right bit) of the output from adder 30 aligned with its least significant bit. If B-path bit field 29 contains no B-path bits because the AC exponent is larger than or equal to the B exponent, then the output from adder 30 forms the result for the operation of A*C+B (hereinafter referred to as the ACB result).

However, if B-path bit field 29 contains B-path bits because the B exponent is greater than the AC exponent, then the output from adder 30 must be modified before it forms the ACB result. Incrementor 33 increments the B-path bits to provide for the situation where the addition within adder 30 produces a carry. Multiplexer 34 permits the selection between incremented B-path bits and unincremented B-path bits. If the addition within adder 30 results in a carry, adder 30 outputs a carry signal to multiplexer 34 triggering multiplexer 34 to output the incremented B-path bits to normalize shifter 35. Alternatively, if the addition within adder 30 produces no carry, adder 30 outputs a carry signal that triggers multiplexer 34 to output the unincremented B-path bits to normalize shifter 35.

The inputting of either the incremented or unincremented B-path bits into normalize shifter 35 modifies the output from adder 30 because normalize shifter 35 inputs the B-path bits with the least significant bit of the B-path bits residing in the bit place directly to the left of the most significant bit of the output from adder 30. Consequently, the B-path bits and the output from adder 30 are concatenated to form an ACB result that reflects the greater magnitude of the B exponent than the AC exponent. Conversely, if the AC exponent is larger than or equal to the B exponent, no B-path bits will exist, resulting in the output from adder 30 forming the ACB result.

Flow 5 includes normalize shifter 35, shift driver 36, leading ones detect (LOD) 32, and leading ones detect (LOD) 37 to accomplish the IEEE required normalization of the ACB result contained within normalize shifter 35. Alignment controller 24 controls LOD's 32 and 37 in accordance with its determination of whether the B exponent is greater than or equal to the AC exponent. If alignment controller 24 determines the B exponent is less than or equal to the AC exponent, then there will be no B-path bits and the output of adder 30 will form the complete ACB result. Consequently, alignment controller 24 enables LOD 32 and disables LOD 37. Once enabled, LOD 32 detects the bit position of the leading one within the output from adder 30 and determines the shift value (i.e, the number of shifts) required to normalize the ACB result.

Alternatively, if alignment controller 24 determines the B exponent is greater than the AC exponent, then the output of adder 30 must be modified with the B-path bits as previously described. Consequently, alignment controller 24 enables LOD 37 and disables LOD 32. Once enabled, LOD 37 detects the leading one within the B-path bits and determines the shift value (i.e., the number of shifts) required to normalize the ACB result.

LOD 37 not only determines the shift value required to normalize the ACB result, but it also determines whether the exponent of the final answer must be adjusted. When the B exponent exceeds the AC exponent, the addition or subtraction performed by adder 30 might result in an ACB result that requires an exponent having a value either one greater or one less than the value of the B exponent outputted to answer adjust circuitry 39 by multiplexer 27. LOD 37 inputs the shift value calculated by alignment controller 24 and compares that shift value with the shift value it determined was necessary to normalize the ACB result. If LOD 37 determines a difference between the two shift values, then the exponent for the final answer must be adjusted.

However, LOD 37 must still determine whether the exponent must be increased or decreased. LOD 37 inputs the sign of the final answer from sign determination circuitry 38 to determine the exponent adjustment, if one is necessary. Illustratively, if the sign of the final answer is positive, then the exponent of the final answer must be incremented. Conversely, if the sign of the final answer is negative, then the exponent of the final answer must be decremented. After determining if an exponent adjust is required, LOD 37 outputs an exponent status signal to answer adjust circuitry 39. Answer adjust circuitry 39 includes an adder that increments or decrements the exponent of the final answer in accordance with the exponent status signal input from LOD 37. Additionally, LOD 37 outputs the exponent status signal to underflow/overflow detector 10.

When the B exponent is less than or equal to the exponent, the addition or subtraction performed by adder 30 might result in an ACB result that requires an exponent adjustment of up to 106. Answer adjust circuitry 39 inputs the shift value determined by LOD 37 and adjusts the answer exponent accordingly.

Once the enabled LOD 32 or 37 determines the shift value necessary to normalize the ACB result within normalize shifter 35, the enabled LOD 32 or 37 outputs the shift value to shift driver 36. Shift driver 36 inputs the normalize shift value and controls normalize shifter 35 to shift the ACB result contained therein until the leading one of the ACB result resides in the most significant bit of normalize shifter 35 as required under the IEEE standards.

In this preferred embodiment, normalize shifter 35 is a three stage shifter that includes a total of 160 bits to accommodate the bits received from adder 30 as well as any B-path bits. Normalize shifter 35 inputs the ACB result with the least significant bit of the ACB result aligned with its least significant bit to provide shift driver 36 with a reference that allows the correct shifting of the ACB result in accordance with the normalize shift value. Normalize shifter 35 performs a major shift, a mid-shift, and/or a minor shift in response to the normalize shift value input from shift driver 36. Shift driver 36 initiates a major shift when the ACB result must be shifted 0, 16, 32, 48, 64, 80, 96, 112, 128, 144, or 160 bits; a mid-shift when the ACB result must be shifted 0, 4, 8, or 12 bits; and/or a minor shift when the ACB result must be shifted 0, 1, 2, or 3 bits. Consequently, shift driver 36 outputs three sets of shift control signals that activate normalize shifter 35. The three sets of shift control signals are grouped in eleven select lines that produce a major shift, four select lines that produce a mid-shift, and four select lines that produce a minor shift. Thus, after inputting a normalize shift value from one of LOD's 32 or 37, shift driver 36 outputs a shift control signal(s) on an appropriate select line(s) to enable normalize shifter 35 and produce a shift in accordance with the normalize shift value. For example, when a shift of 106 bits is required for normalization of the ACB result, shift driver 34 activates the major shift select line corresponding to a shift of 96 bits, the mid-shift select line corresponding to a shift of 8 bits, and the minor shift select line corresponding to a shift of 2 bits. Accordingly, shift driver 34 activates the major shift select lines, mid-shift select lines, and/or minor shift select lines in any combination to produce shifts within normalize shifter 35 from 0 to 161 bits. Additionally, shift driver 36 outputs the shift control signal(s) to underflow/overflow detector 10.

After the normalization of the ACB result, answer adjust circuitry 39 adjusts the final answer to conform to an IEEE standard. As previously described, answer adjust circuitry 39 adjusts the exponent of the final answer, if required. Furthermore, answer adjust circuitry 39 includes a round circuit that rounds the ACB result so that the mantissa of the final answer contains the bit number required under the IEEE standard. Additionally, answer adjust circuitry 39 inputs a underflow/overflow error signal from underflow/overflow detector 10 and outputs a flag with the final answer indicating if the final answer contains an underflow or overflow error.

Figure 2:
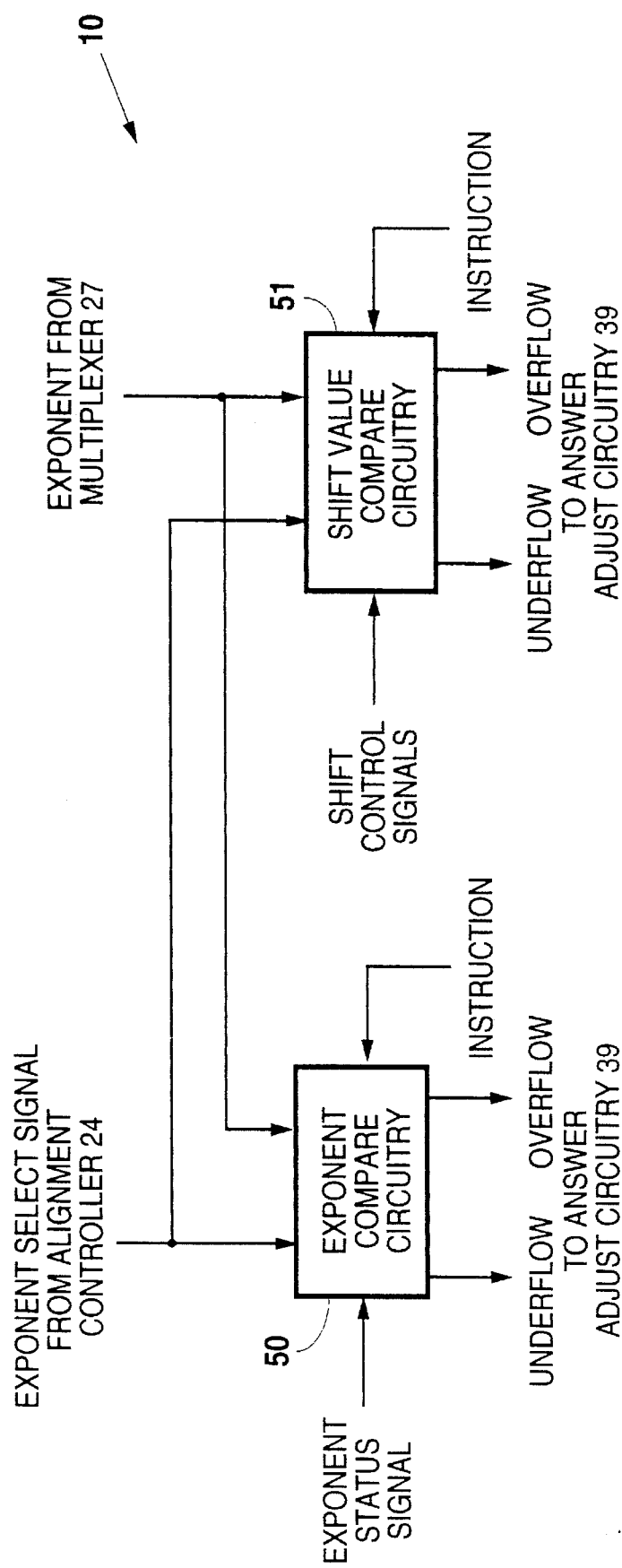
FIG. 2 is a block diagram illustrating the underflow/overflow detector.

As illustrated in FIG. 2, underflow/overflow detector 10 includes exponent compare circuitry 50 and shift value compare circuitry 51 to determine if an underflow or underflow error has occurred. Exponent compare circuitry 50 determines underflow/overflow error when the B exponent exceeds the AC exponent, while shift value compare circuitry 51 determines underflow/overflow error when the AC exponent exceeds or equals the B exponent. Consequently, alignment controller 24 enables one of exponent compare circuitry 51 and shift value compare circuitry 51 predicated upon the values of the AC exponent and B exponent.

If alignment controller 24 determines the B exponent exceeds the AC exponent, it outputs an exponent select signal that enables exponent compare circuitry 50 and triggers multiplexer 27 to output the B exponent. Exponent compare circuitry 50 inputs the B exponent and compares it to the maximum and minimum exponent values permissible under the IEEE standards appropriate for the instruction (i.e., single precision or double precision). Additionally, exponent compare circuitry 50 inputs the exponent status signal output from LOD 37 to ensure an exponent increase or decrease resulting from the addition or subtraction between the AC result and B mantissa does not cause an underflow or overflow error.

Alternatively, if alignment controller 24 determines the AC exponent exceeds the B exponent, it outputs an exponent select signal that enables shift value compare circuitry 51. Alignment controller 24 also triggers multiplexer 27 to output the AC exponent calculated by adder 25. Similarly, if alignment controller 24 determines the AC exponent equals the B exponent, it enables shift value compare circuitry 51 and triggers multiplexer 27 to output the B exponent. Once enabled, shift value compare circuitry 51 inputs the AC exponent or B exponent and decodes the exponent into a shift value. Shift value compare circuitry 51 then inputs the shift control signals output from shift driver 36 and compares those shift control signals to its decoded shift value to determine if an underflow or overflow error will occur.

Although underflow/overflow detector 10 includes exponent compare circuitry 50, that circuitry is not absolutely necessary and is included because the direct compare of the B exponent increases the overall operating speed of a floating point unit implementing underflow/overflow detector 10. Accordingly, those skilled in the art will recognize that shift value compare circuitry 51 can also determine underflow or overflow errors when the B exponent exceeds the AC exponent. In that instance, shift value compare circuitry 51 would input the B exponent and decode the B exponent into a shift value. Shift value compare circuitry 51 would then input from shift driver 36 the shift control signals associated with LOD 37 and compare those shift control signals to its decoded shift value to determine if an underflow or overflow error will occur.

Figure 3:
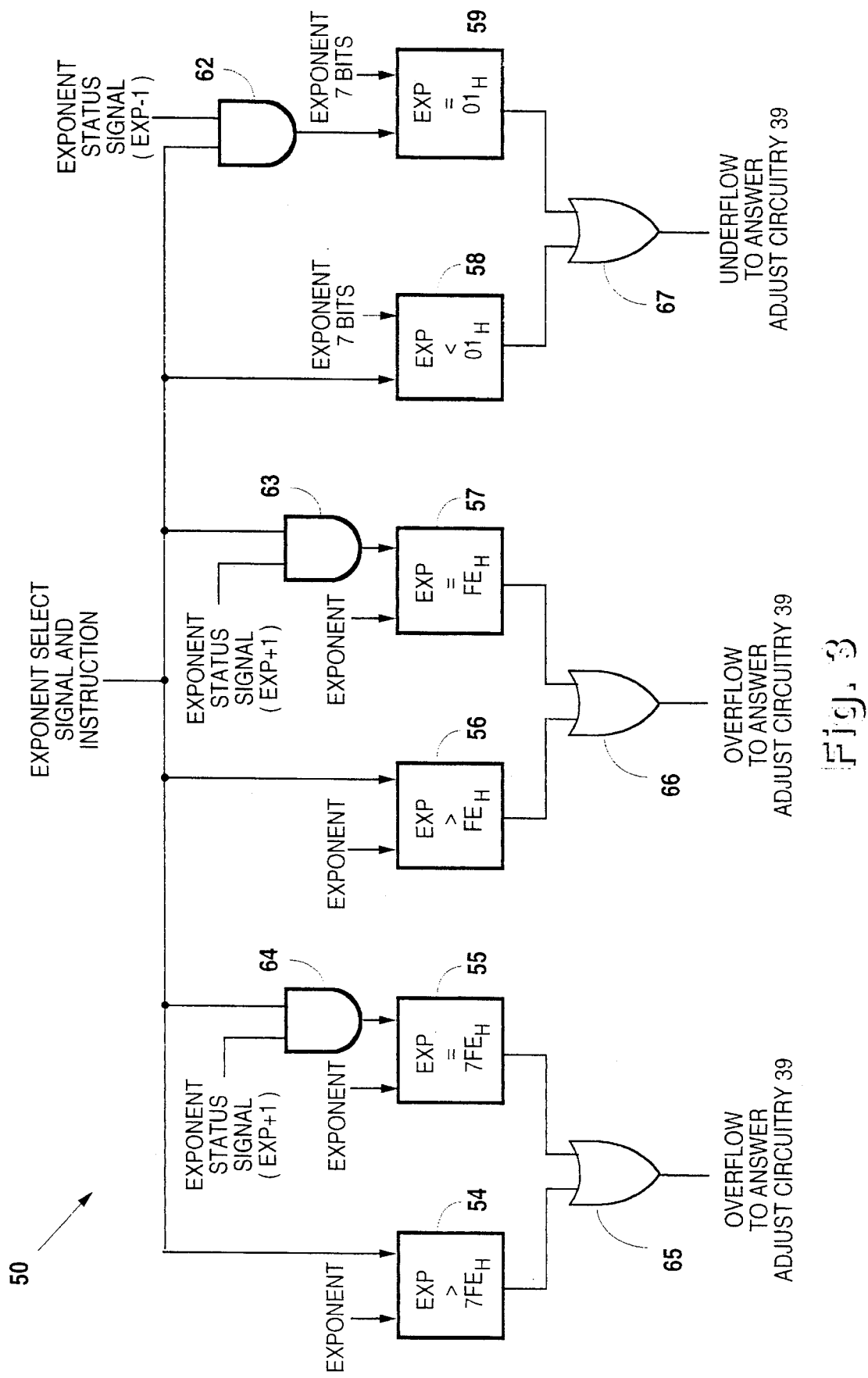
FIG. 3 is a block diagram illustrating the exponent compare circuitry of the underflow/overflow detector.

As illustrated in FIG. 3, the exponent select signal and the instruction select appropriate ones of comparators 54–59 to determine the condition of the exponent. The lower seven bits of the minimum exponent value in both single precision and double precision are the same value of $01_H$. Thus, regardless of whether the B exponent is for a single or double precision floating point number, only one determination of underflow must be made. If the lower seven bits of the B exponent are less than $01_H$, then an underflow error has occurred and comparator 58 outputs an underflow error signal, otherwise comparator 58 furnishes no output.

Comparator 59 determines if an underflow error will occur in response to the decrementing of the exponent in the final answer. Thus, comparator 59 must receive an exponent status signal from LOD 37 indicating an exponent decrement along with the exponent select signal and the instruction. AND gate 62 AND's the exponent select signal, the instruction, and the exponent status signal output from LOD 37 to provide comparator 59 with an enable signal. If the exponent status signal indicates that the exponent will remain the same or will be incremented, comparator 59 will not be enabled. However, if the exponent status signal indicates an exponent decrement, comparator 59 compares the lower seven bits of the exponent to determine if it equals $01_H$. When the exponent of the final answer is to be decremented and the B exponent equals $001_H$, an underflow error will occur and comparator 59 outputs an underflow error signal. Otherwise, comparator 59 furnishes no output. OR gate 67 OR's the outputs from comparators 58 and 59 to supply answer adjust circuitry 39 with an underflow error signal if either comparator 58 or comparator 59 detects an underflow error.

If the instruction indicates the answer requires a single precision exponent, comparator 56 is enabled. Comparator 56 inputs the B exponent and compares it to the maximum exponent range of $FE_H$ for single precision floating point numbers. If comparator 56 determines the B exponent exceeds $FE_H$, it outputs an overflow error signal, otherwise, comparator 56 provides no output.

The exponent select signal and the instruction will also enable comparator 57 if the exponent status signal output from LOD 37 indicates an exponent increment. AND gate 63

AND's the exponent select signal, the instruction, and the exponent status signal to provide an enable signal for comparator 57. Comparator 57 inputs the B exponent and determines if it equals the maximum exponent of $FE_H$ for single precision floating point numbers. When the exponent of the final answer is to be incremented and the B exponent equals $FE_H$, an overflow error will occur and comparator 57 outputs an overflow error signal. Otherwise, comparator 57 furnishes no output. OR gate 66 OR's the outputs from comparators 56 and 57 to supply answer adjust circuitry 39 with an overflow error signal if either comparator 56 or comparator 57 detects an overflow error.

If the instruction indicates the answer requires a double precision exponent, comparator 54 is enabled. Comparator 54 inputs the B exponent and compares it to the maximum exponent range of $7FE_H$ for double precision floating point numbers. If comparator 54 determines the B exponent exceeds $7FE_H$, it outputs an overflow error signal, otherwise, comparator 54 provides no output.

The exponent select signal and the instruction will also enable comparator 55 if the exponent status signal output from LOD 37 indicates an exponent increment. AND gate 63 AND's the exponent select signal, the instruction, and the exponent status signal to provide an enable signal for comparator 55. Comparator 55 inputs the B exponent and determines if it equals the maximum exponent of $7FE_H$ for double precision floating point numbers. When the exponent of the final answer is to be incremented and the B exponent equals $7FE_H$, an overflow error will occur and comparator 55 outputs an overflow error signal. Otherwise, comparator 55 furnishes no output. OR gate 65 OR's the outputs from comparators 54 and 55 to supply answer adjust circuitry 39 with an overflow error signal if either comparator 54 or comparator 55 detects an overflow error.

Figure 4:
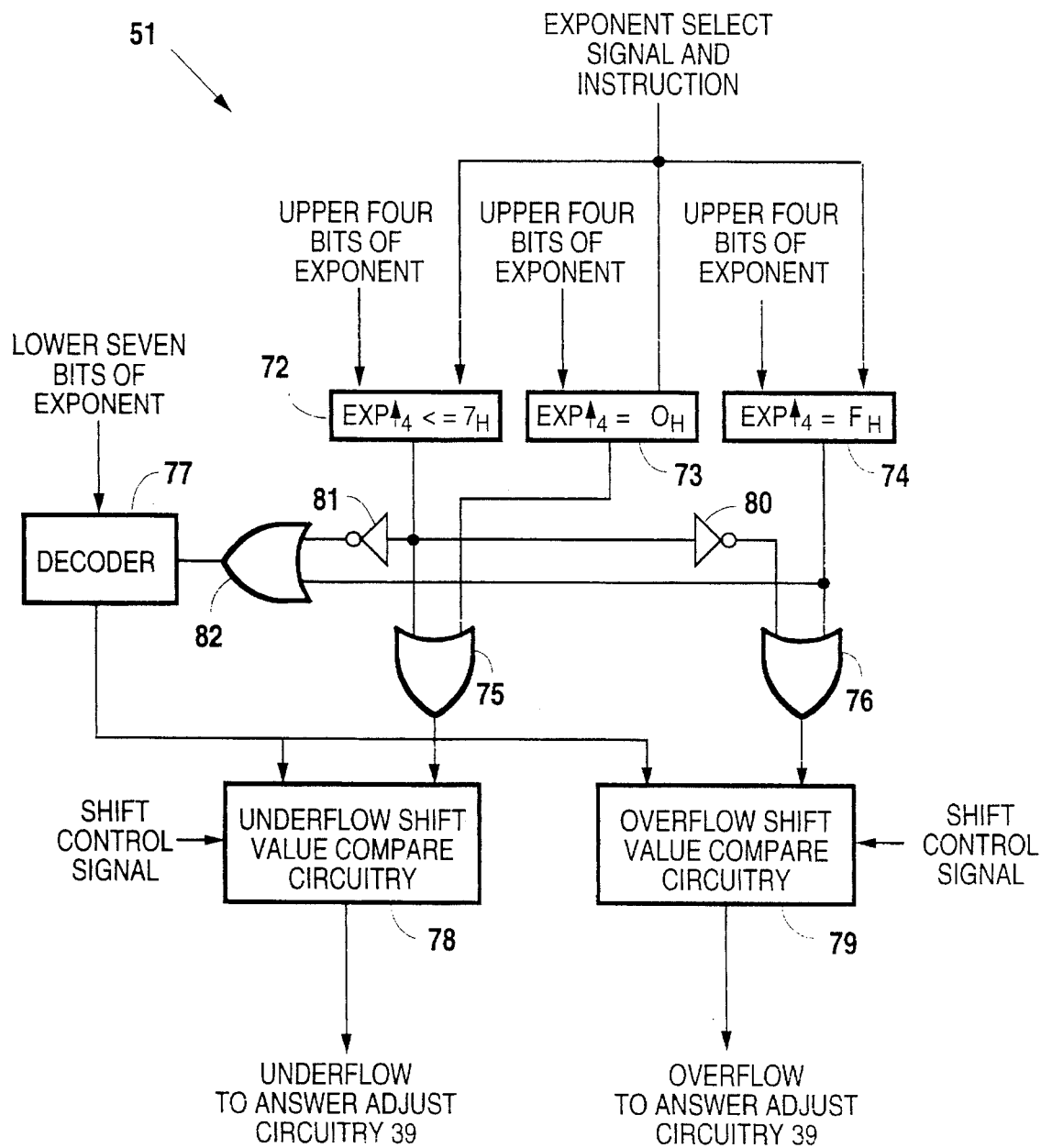
FIG. 4 is a block diagram illustrating the shift value compare circuitry of the underflow/overflow detector.

As illustrated in FIG. 4, the exponent select signal and the instruction select an appropriate one(s) of comparators 72–74 to determine whether underflow shift value compare circuitry 78 or overflow shift value compare circuitry 79 must be enabled. Shift value compare circuitry 51 includes comparators 72–74 to determine whether the exponent output from multiplexer 27 has the potential to underflow or overflow during the normalization of the ACB result. An exponent may have the potential to underflow during normalization, or an exponent may have the potential to overflow during normalization; however, any one exponent does not have the potential to do both. That is, a positive exponent may overflow during normalization, but it will never underflow. Conversely, a negative exponent may underflow during normalization, but it will never overflow.

If the instruction indicates the answer requires a single precision exponent, comparator 72 is enabled. Comparator 72 inputs the upper four bits of the exponent output from multiplexer 27 to determine whether the exponent is positive or negative. Only the upper four bits of the exponent are required because those bits indicate the transition from negative exponents to positive exponents. That is, the upper four bits of all negative single precision exponents are less than or equal to $7_H$, while the upper four bits of all positive single precision exponents are greater than $7_H$. Consequently, comparator 72 compares the upper four bits of the exponent to $7_H$ to determine the sign of the exponent. If comparator 72 determines the upper four bits of the exponent are less than or equal to $7_H$, the exponent is negative, and comparator 72 enables underflow shift value compare circuitry 78 through OR gate 75 so that the exponent will be examined for an underflow error.

Conversely, if comparator 72 determines the upper four bits of the exponent are greater than $7_H$, it outputs a disable signal. However, when the upper four bits of the exponent exceed $7_H$, the exponent is positive and must be examined for an overflow error. Thus, invertor 80 complements the disable signal output from comparator 72 to produce an enable signal output to overflow shift value compare circuitry 79 through OR gate 76.

If the instruction indicates the answer requires a double precision exponent, comparators 73 and 74 are enabled. Comparators 73 and 74 input the upper four bits of the exponent output from multiplexer 27 to determine if either underflow shift value compare circuitry 78 or overflow shift value compare circuitry 79 must be enabled. In double precision format, there exists a range of positive exponents and a range of negative exponents that require complicated decoding to produce a shift value. However, that range of positive exponents will never overflow, while the range of negative exponents will never underflow. Thus, comparator 73 determines whether an exponent is negative and within the range of negative exponents that potentially might underflow, while comparator 74 determines whether the exponent is positive and within the range of positive exponents that potentially might overflow.

Comparator 73 inputs the upper four bits of the exponent output from multiplexer 27 and compares those bits to the number $0_H$ because the upper four bits of negative exponents that may potentially underflow produce the number $0_H$. If comparator 73 determines the upper four bits of the exponent equal $0_H$, the exponent is negative and may potentially underflow. In response to that determination, comparator 73 enables underflow shift value compare circuitry 78 through OR gate 75 so that the exponent will be examined for an underflow error. Conversely, if comparator 73 determines the upper four bits of the exponent exceed $0_H$, it furnishes no enable signal because the exponent is either positive or will not underflow.

Comparator 74 inputs the upper four bits of the exponent output from multiplexer 27 and compares those bits to the number $F_H$ because the upper four bits of positive exponents that may potentially overflow produce the number $F_H$. If comparator 74 determines the upper four bits of the exponent equal $F_H$, the exponent is positive and may potentially overflow. In response to that determination, comparator 74 enables overflow shift value compare circuitry 78 through OR gate 75 so that the exponent will be examined for an overflow error. Alternatively, if comparator 74 determines the upper four bits of the exponent are less than $F_H$, it furnishes no enable signal because the exponent is either negative or will not overflow. Accordingly, comparators 73 and 74 provide a quick determination of whether underflow shift value compare circuitry 78 or overflow shift value compare circuitry 79 must be enabled.

Exponent ranges that will not underflow or overflow exist because, in this preferred embodiment although normalize shifter 35 includes 160 bits to accommodate both the 106 bits from adder 30 and the 54 bits from the B-path bits, the actual maximum number of bit positions that any leading 1 will have to be shifted for proper normalization is 106. As a result, some positive exponents are too small to overflow when increased in an amount corresponding to a 106 bit normalization. Similarly, some negative exponents are too large to underflow when decreased in an amount corresponding to a 106 bit normalization.

When the B exponent exceeds the AC exponent, the maximum shift required to place the leading 1 to the left of the most significant bit of normalize shifter 35 is 55 because the B path bits are placed in normalize shifter 35 beginning at the 107th bit. Furthermore, when B-path bits exist, the shift value is not used in determining underflow or overflow because a direct compare may be done utilizing exponent compare circuitry 50 as previously described.

When the bits output from adder 30 form the ACB result because the AC exponent equals or exceeds the B exponent, LOD 32 establishes the position of the leading 1 and determines the shift value relative to the 106 bit field resulting from the multiplication of the A mantissa with the C mantissa in double precision format. LOD 32 utilizes the 106 bit field to determine the shift value even though normalize shifter includes 160 bits because LOD can only determine a leading 1 relative to the total number of bits it inputs. Thus, because the AC result includes 106 bits, LOD 32 determines the position of the leading 1 and the necessary shift value relative to a 106 bit field.

Although LOD 32 determines the shift value required to normalize the leading 1 relative to the 106 bit field associated with the AC result, the leading 1 of the ACB result must still be shifted to the left of the most significant bit of normalize shifter 35 before output to answer adjust circuitry 39. Thus, every shift value output from LOD 32 must be increased by 55 so that the leading 1 will always be shifted to the left of the most significant bit of normalize shifter 35. The compensation of the of the shift value output from LOD 32 is accomplished through the connection of normalize shifter 35 to shift driver 36. When LOD 37 furnishes the shift value for shift driver 36, normalize shifter 35 inputs the selected major, mid, and minor shift control signals such that the exact shift amount results. However, when LOD 32 furnishes the shift value for shift driver 36, normalize shifter 35 compensates for the selected major, mid, and minor shift control signals such that the resulting shift is actually 55 greater than the shift value output from shift driver 36. Illustratively, if LOD 32 determines the leading 1 resides within the least significant bit of the 106 bit field, it would produce a shift value of 106. Shift driver 36 would enable select lines corresponding to a 106 bit shift, however, normalize shifter would input those select lines to produce a 55 bit shift compensation. Consequently, normalize shifter would actually shift the leading 1 161 bits to place it to the left of its most significant bit as required in the IEEE standard.

Shift value compare circuitry 51 includes decoder 77 to decode the exponent output from multiplexer 27 into an exponent shift value. Decoder 77 decodes the exponent into an exponent shift value because a floating point exponent cannot be directly compared to a normalize shift value. Decoder 77 inputs and decodes the lower seven bits of the exponent for both single precision format and double precision format. Only the lower seven bits are necessary for decoding an exponent in either single or double precision format because those bits provide sufficient information to permit the decoding of an exponent into a shift value corresponding to one of the 106 shift values output to shift driver 36 from LOD 32. That is, the decoding of the lower seven bits produces a maximum shift value of 127 which provides a shift value range including the required 106 bit shift. Accordingly, the decoding of additional bits would unnecessarily provide shift values greater than the 106 required to normalize the ACB result when the AC exponent exceeds or equals the B exponent. However, those skilled in the art will recognize that the decoding of additional bits will permit the comparison of shift value for bit fields requiring more than a 106 bit shift for normalization.

Figure 5:
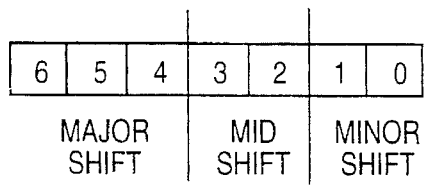
FIG. 5 is a diagram of an exponent bit field illustrating the decode scheme of the underflow/overflow detector.

As illustrated in FIG. 5, decoder 77 examines bits 0 and 1 to determine the minor shift value of the exponent, bits 2 and 3 to determine the mid-shift value of the exponent, and bits 4, 5, and 6 to determine the major shift value of the exponent. Each of the three sets of bits are weighted with a numeric value to permit the determination of a shift value associated with an exponent. That is, bits 0 and 1 are weighted one, bits 2 and 3 are weighted four, and bits 4, 5, and 6 are weighted sixteen. Illustratively, the lower seven bits of the negative exponent $4B_H$, which are represented by 1001011 in binary, decode to a shift value of 75. Bits 0 and 1 contain the number three and thus produce a shift value of three (3*1=3). Bits 2 and 3 contain the number two and thus produce a shift value of eight (2*4=8). Finally, bits 4, 5, and 6 contain the number 4 and thus produce a shift value of sixty four (4*16=64). When the major, mid, and minor shifts are added together, they create a shift value totaling seventy five. After determining the shift value corresponding to the exponent output from multiplexer 27, decoder 77 outputs to overflow shift value compare circuitry 79 and underflow shift value compare circuitry 78 the major, mid, and minor shift values on a select line that corresponds to a select lines from shift driver 36.

Although negative exponents decode directly into shift values, positive exponents do not and, therefore, must include an offset. If comparator 72 determines a single precision exponent output from multiplexer 27 is positive, it outputs a disable signal. Invertor 82 complements the disable signal and outputs the complemented disable signal to decoder 77 through OR gate 82. Similarly, if comparator 74 determines a double precision exponent output from multiplexer 27 is positive, it outputs an enable to decoder 77 through OR gate 82. When decoder 77 receives a signal from either invertor 82 or comparator 74 indicating the exponent is positive, it offsets the seven bits of the exponent by adding two. By adding an offset of 2 to the lower seven bits of positive exponents, decoder 77 produces numbers that decode into the correct shift values. Illustratively, the positive exponent $FE_H$ cannot be incremented without an overflow and, therefore, must have a shift value of 0 associated with it. Without an offset of 2, the lower seven bits of the positive exponent $FE_H$, which are 1111110 in binary, produce the incorrect shift value of 126. However, when offset by 2, the lower seven bits of the positive exponent $FE_H$ become 0000000 in binary which decode into the correct shift value of 0.

If underflow shift value compare circuitry 78 is enabled as previously described, it inputs the shift values output on the select lines of decoder 77. Similarly, underflow shift value compare circuitry 78 inputs the shift values output from shift driver 34 on its select lines. Underflow shift value compare circuitry 78 compares the two groups of select lines and determines if an underflow will occur.

Conversely, if overflow shift value compare circuitry 79 is enabled as previously described, it inputs the shift values output on the select lines of decoder 77. Similarly, overflow shift value compare circuitry 79 inputs the shift values output from shift driver 34 on its select lines. Overflow shift value compare circuitry 78 compares the two groups of select lines and determines if an overflow will occur.

Figure 6:
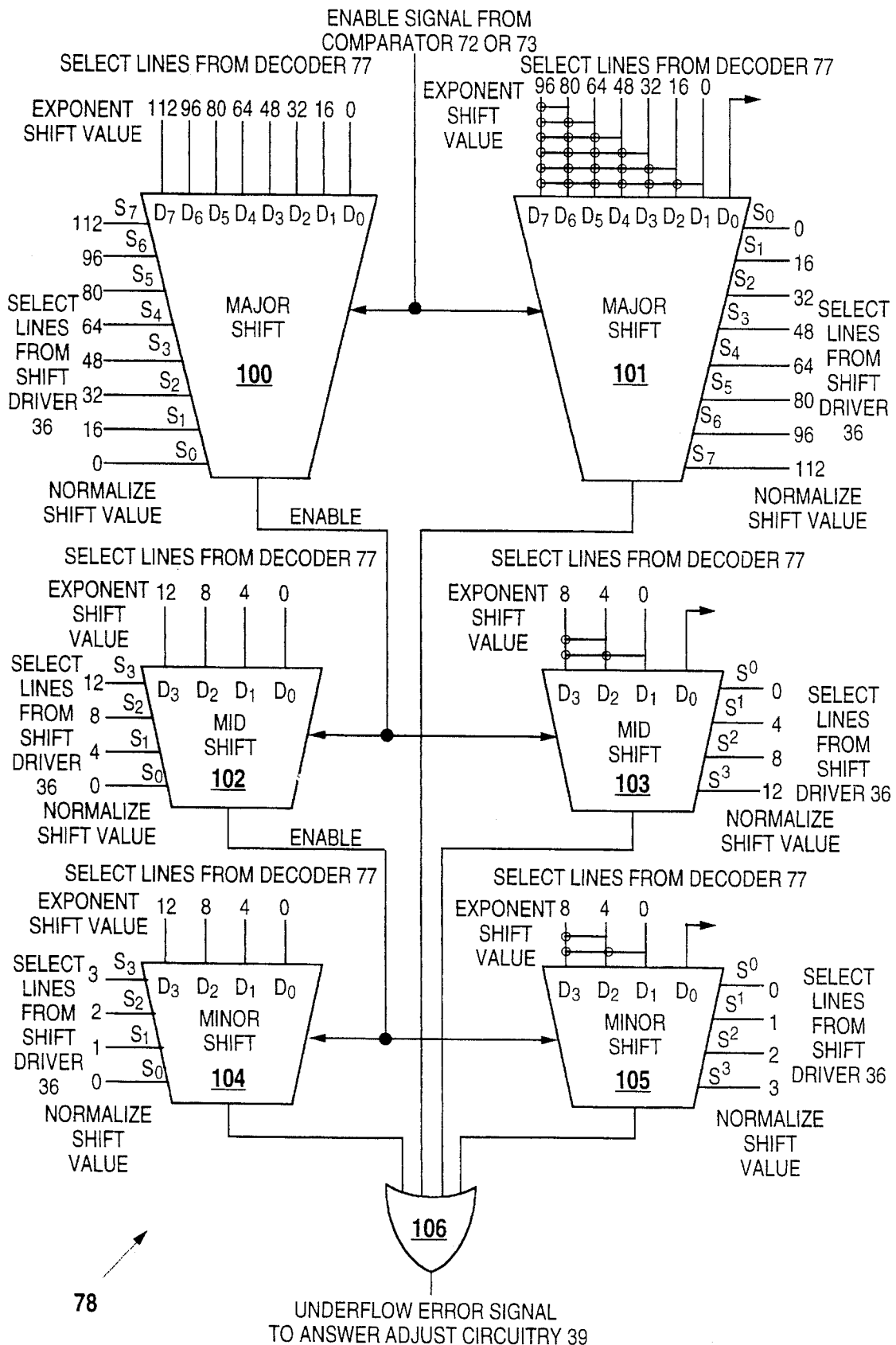
FIG. 6 is a block diagram illustrating the underflow shift value compare circuitry of the underflow/overflow detector.

As illustrated in FIG. 6, underflow shift value compare circuitry 78 includes multiplexers 100–105 to determine if an underflow error will occur during the normalization of the ACB result. The outputs of comparators 72 and 73 are connected to multiplexers 100 and 101 via OR gate 75. If either comparator 72 or 73 determines the exponent output from multiplexer 27 is negative and potentially might underflow, they output a signal that enables multiplexers 100 and 101 so that the negative exponent may be examined for an underflow error.

In normalizing the ACB result in accordance with the normalize shift value, normalize shifter 35 shifts the leading 1 left until it resides to the left of the most significant bit. However, when the AC exponent exceeds or equals the B exponent, normalize shifter 35 compensates the normalize shift value with an additional 55 bit shift to ensure the proper positioning of the leading 1. Normalize shifter 35 employs only a left shift during normalization because unidirectional shifting is less complicated to implement.

A left shift manipulates the ACB result such that its exponent decreases by one for each shift produced from the normalize shift value. Consequently, a negative exponent output from multiplexer 27 will underflow if it has a numeric value less than or equal to the number of shifts produced by the normalize shift value. Thus, a comparison of negative exponents to the normalize shift value will determine underflow. However, floating point exponents cannot be directly compared to normalize shift values. Accordingly, decoder 77 decodes negative exponents into a major shift value, a mid-shift value, and a minor shift value that correspond to the normalize shift value that will cause an underflow to permit a comparison of negative exponents to normalize shift values.

Once enabled, multiplexer 100 determines if the normalize major shift value output from shift driver 36 during the normalization of the ACB result equals the exponent major shift value determined by decoder 77. Multiplexer 100 includes ports $S_0$–$S_7$ that connect to a major shift select line from shift driver 36. Specifically, port $S_0$ connects to the select line enabled to produce a shift of 0, port $S_1$ connects to the select line enabled to produce a shift of 16, port $S_2$ connects to the select line enabled to produce a shift of 32, port $S_3$ connects to the select line enabled to produce a shift of 48, port $S_4$ connects to the select line enabled to produce a shift of 64, port $S_5$ connects to the select line enabled to produce a shift of 80, port $S_6$ connects to the select line enabled to produce a shift of 96, and port $S_7$ connects to the select line enabled to produce a shift of 112. Multiplexer 100 inputs the normalize major shift values of 0, 16, 32, 38, 64, 80, 96, and 112 because decoder 77 only decodes the lower seven bits for a maximum exponent shift value of 127.

Multiplexer 100 includes ports $D_0$–$D_7$ that connect to a major shift select line from decoder 77. Specifically, port $D_0$ connects to the select line enabled if the major shift for the exponent is 0, port $D_1$ connects to the select line enabled if the major shift for the exponent is 16, port $D_2$ connects to the select line enabled if the major shift for the exponent is 32, port $D_3$ connects to the select line enabled if the major shift for the exponent is 48, port $D_4$ connects to the select line enabled if the major shift for the exponent is 64, port $D_5$ connects to the select line enabled if the major shift for the exponent is 80, port $D_6$ connects to the select line enabled if the major shift for the exponent is 96, and port $D_7$ connects to the select line enabled if the major shift for the exponent is 112.

In this preferred embodiment, multiplexer 100 is an 8 to 1 multiplexer that produces an output when one of ports $S_0$–$S_7$ and a corresponding one of ports $D_0$–$D_7$ both receive an input. For example, if port $S_4$ receives an input signal when port $D_4$ is also receiving an input signal, multiplexer 100 produces an output because ports $S_4$ and $D_4$ are corresponding ports. Conversely, if the inputs into multiplexer 100 occur at an S-port and a D-port that do not correspond, multiplexer 100 furnishes no output.

Consequently, multiplexer 100 determines if the normalize major shift value output from shift driver 36 equals the exponent major shift value output from decoder 77. Illustratively, when a major shift of 64 bits is required during normalization, shift driver 36 enables the select line that controls normalize shifter 35 to shift the ACB result 64 bits. As previously described, that select line also furnishes multiplexer 100 with an input at port $S_4$. If the exponent major shift value equals a shift of 64, decoder 77 enables the select line furnishing multiplexer 100 with an input at port $D_4$. Because ports $S_4$ and $D_4$ are corresponding ports receiving concurrent input signals, multiplexer 100 provides an output that enables multiplexers 102 and 103. Alternatively, if decoder 77 enabled any D-port other than $D_4$, multiplexer 100 provides no output and multiplexers 102 and 103 remain disabled.

Once enabled, multiplexer 101 determines if the normalize major shift value output from shift driver 36 during the normalization of the ACB result exceeds the exponent major shift value determined by decoder 77. Multiplexer 101 is an 8 to 1 multiplexer identical to multiplexer 100. Multiplexer 101 includes ports $S_0$–$S_7$ that connect to a major shift select line from shift driver 36 in exactly the same configuration as multiplexer 100.

Multiplexer 101 includes port $D_0$ that is grounded to prevent an incorrect output from multiplexer 101. Port $D_0$ is grounded because its corresponding port $S_0$ connects to the select line from shift driver 36 enabled to produce a major shift of 0 during normalization. A major shift of 0 for normalization will never exceed the exponent major shift value determined by decoder 77. Consequently, when shift driver 36 enables the select line producing a major shift of 0, multiplexer 101 must always provide no output signal. Grounding port $D_0$ ensures that multiplexer 101 furnishes no output whenever port So provides multiplexer 101 with an input.

Multiplexer 101 includes ports $D_1$–$D_7$ that connect to a major shift select line from decoder 77. Specifically, port $D_1$ connects to the select line enabled if the major shift for the exponent is 0, port $D_2$ connects to the select line enabled if the major shift for the exponent is 16, port $D_3$ connects to the select line enabled if the major shift for the exponent is 32, port $D_4$ connects to the select line enabled if the major shift for the exponent is 48, port $D_5$ connects to the select line enabled if the major shift for the exponent is 64, port $D_6$ connects to the select line enabled if the major shift for the exponent is 80, and port $D_7$ connects to the select line enabled if the major shift for the exponent is 96. The select line enabled if the major shift for the exponent is 112 is not connected to multiplexer 101 because no normalize major shift value output from shift driver 36 will exceed an exponent major shift value of 112. Consequently, if the exponent major shift value equals 112, multiplexer 101 furnishes no output.

To determine if the normalize major shift value exceeds the exponent shift value, ports $D_1$–$D_7$ each connect to a select line from decoder 77 enabled for an exponent major shift value that is one shift level less than the normalize major shift value input at a corresponding port $S_1$–$S_7$. For example, port $D_4$ connects to the select line enabled if the major shift for the exponent is 48, however, its corresponding port $S_4$ connects to the select line enabled by shift driver 36 to produce a shift of 64. Thus, if port $D_4$ receives an input signal when port $S_4$ is also receiving an input signal, multiplexer 101 produces an output because ports $D_4$ and $S_4$ are corresponding ports and the normalize major shift value exceeds the exponent major shift value.

Furthermore, a port $D_1$–$D_6$ receiving an input from a select line enabled by decoder 77 must not only determine if its corresponding port $S_1$–$S_6$ is receiving an input signal, but the port $D_1$–$D_6$ must also determine if any subsequent port $S_2$–$S_7$ is receiving an input signal. A port $D_1$–$D_6$ receiving an input from decoder 77 must determine if a subsequent port $S_2$–$S_7$ receives an input because each subsequent port $S_2$–$S_7$ connects to a major shift select line from shift driver 36 that produces a normalize major shift greater than the major shift of the exponent input into the port $D_1$–$D_6$.

To ascertain whether shift driver 36 has enabled a select line producing a normalize major shift value greater than the exponent major shift value, each port $D_1$–$D_6$ is OR'ed with its subsequent port(s) $D_2$–$D_7$. Specifically, port $D_1$ is OR'ed with ports $D_2$–$D_7$, port $D_2$ is OR'ed with ports $D_3$–$D_7$, port $D_3$ is OR'ed with ports $D_4$–$D_7$, port $D_4$ is OR'ed with ports $D_5$–$D_7$, port $D_5$ is OR'ed with ports $D_6$ and $D_7$, and port $D_6$ is OR'ed with port $D_7$. Essentially, by OR'ing each port $D_1$–$D_6$ with its subsequent port(s) $D_2$–$D_7$, each port $S_2$–$S_7$ that corresponds to one of the subsequent port(s) $D_2$–$D_7$ will also correspond to a prior port $D_1$–$D_6$. Port $D_7$ requires no OR'ing because only a normalize shift value of 112 will result in an underflow.

Consequently, multiplexer 101 determines if the normalize major shift value output from shift driver 36 exceeds the exponent major shift value output from decoder 77. Illustratively, when a major shift of 80 bits is required during normalization, shift driver 36 enables the select line that controls normalize shifter 35 to shift the ACB result 80. As previously described, that select line also furnishes multiplexer 101 with an input at port $S_5$. If the exponent major shift value equals a shift of 32, decoder 77 enables the select line furnishing multiplexer 101 with an input at port $D_3$. Because port $D_3$ is OR'ed with ports $D_4$–$D_7$, each of ports $S_3$–$S_7$ corresponds to port $D_3$ such that, if any one of ports $S_3$–$S_7$ receives an input, multiplexer 101 furnishes an output indicating an underflow to answer adjust circuitry 39 through OR gate 106. Accordingly, since shift driver 36 enabled the select line producing a major shift of 80 bits, multiplexer 101 detects an underflow error because both port $D_3$ and port $S_5$ have received concurrent input signals which indicates the normalize major shift value exceeds the exponent major shift value. Alternatively, if shift driver 36 enabled any one of ports $S_0$–$S_2$, multiplexer 101 produces no output because the exponent major shift value exceeds the normalize major shift value.

If multiplexer 100 determines the normalize major shift value equals the exponent major shift value, the normalize mid-shift value must be compared to the exponent mid-shift value. Consequently, multiplexer 100 furnishes a signal that enables multiplexers 102 and 103. Once enabled, multiplexer 102 determines if the normalize mid-shift value output from shift driver 36 during the normalization of the ACB result equals the exponent mid-shift value determined by decoder 77. Multiplexer 102 includes ports $S_0$–$S_3$ that connect to a mid-shift select line from shift driver 36. Specifically, port $S_0$ connects to the select line enabled to produce a shift of 0, port $S_1$ connects to the select line enabled to produce a shift of 4, port $S_2$ connects to the select line enabled to produce a shift of 8, and port $S_3$ connects to the select line enabled to produce a shift of 12.

Multiplexer 102 includes ports $D_0$–$D_3$ that connect to a mid-shift select line from decoder 77. Specifically, port $D_0$ connects to the select line enabled if the mid-shift for the exponent is 0, port $D_1$ connects to the select line enabled if the mid-shift for the exponent is 4, port $D_2$ connects to the select line enabled if the mid-shift for the exponent is 8, and port $D_3$ connects to the select line enabled if the mid-shift for the exponent is 12.

In this preferred embodiment, multiplexer 102 is a 4 to 1 multiplexer that produces an output when one of ports $S_0$–$S_3$ and a corresponding one of ports $D_0$–$D_3$ both receive an input. For example, if port $S_2$ receives an input signal when port $D_2$ is also receiving an input signal, multiplexer 102 produces an output because ports $S_2$ and $D_2$ are corresponding ports. Conversely, if the inputs into multiplexer 102 occur at an S-port and a D-port that do not correspond, multiplexer 102 furnishes no output.

Consequently, multiplexer 102 determines if the normalize mid-shift value output from shift driver 36 equals the exponent mid-shift value output from decoder 77. Illustratively, when a mid-shift of 8 bits is required during normalization, shift driver 36 enables the select line that controls normalize shifter 35 to shift the ACB result 8 bits. As previously described, that select line also furnishes multiplexer 102 with an input at port $S_2$. If the exponent mid-shift value equals a shift of 8, decoder 77 enables the select line furnishing multiplexer 102 with an input at port $D_2$. Because ports $S_2$ and $D_2$ are corresponding ports receiving concurrent input signals, multiplexer 102 provides an output that enables multiplexers 104 and 105. Alternatively, if decoder 77 enabled any D-port other than $D_2$, multiplexer 102 provides no output and multiplexers 104 and 105 remain disabled.

Once enabled, multiplexer 103 determines if the normalize mid-shift value output from shift driver 36 during the normalization of the ACB result exceeds the exponent mid-shift value determined by decoder 77. Multiplexer 103 is a 4 to 1 multiplexer identical to multiplexer 102. Multiplexer 103 includes ports $S_0$–$S_3$ that connect to a mid-shift select line from shift driver 36 in exactly the same configuration as multiplexer 102.

Multiplexer 103 includes port $D_0$ that is grounded to prevent an incorrect output from multiplexer 103. Port $D_0$ is grounded because its corresponding port $S_0$ connects to the select line from shift driver 36 enabled to produce a mid-shift of 0 during normalization. A mid-shift of 0 for normalization will never exceed the exponent mid-shift value determined by decoder 77. Consequently, when shift driver 36 enables the select line producing a mid-shift of 0, multiplexer 103 must always provide no output signal. Grounding port $D_0$ ensures that multiplexer 103 furnishes no output whenever port $S_0$ provides multiplexer 103 with an input.

Multiplexer 103 includes ports $D_1$–$D_3$ that connect to a mid-shift select line from decoder 77. Specifically, port $D_1$ connects to the select line enabled if the mid-shift for the exponent is 0, port $D_2$ connects to the select line enabled if the mid-shift for the exponent is 4, and port $D_3$ connects to the select line enabled if the mid-shift for the exponent is 8. The select line enabled if the mid-shift for the exponent is 12 is not connected to multiplexer 103 because no normalize mid-shift value output from shift driver 36 will exceed an exponent mid-shift value of 12. Consequently, if the exponent mid-shift value equals 12, multiplexer 103 furnishes no output.

To determine if the normalize mid-shift value exceeds the exponent shift value, ports $D_1$–$D_3$ each connect to a select line from decoder 77 enabled for an exponent mid-shift value that is one shift level less than the normalize mid-shift value input at a corresponding port $S_1$–$S_3$. For example, port $D_2$ connects to the select line enabled if the mid-shift for the exponent is 4, however, its corresponding port $S_2$ connects to the select line enabled by shift driver 36 to produce a shift of 8. Thus, if port $D_2$ receives an input signal when port $S_2$ is also receiving an input signal, multiplexer 103 produces an output because ports $D_2$ and $S_2$ are corresponding ports and the normalize mid-shift value exceeds the exponent mid-shift value.

Furthermore, a port $D_1$–$D_3$ receiving an input from a select line enabled by decoder 77 must not only determine if its corresponding port $S_1$–$S_3$ is receiving an input signal, but the port $D_1$ or $D_2$ must also determine if any subsequent port $S_2$ or $S_3$ is receiving an input signal. A port $D_1$ or $D_2$ receiving an input from decoder 77 must determine if a subsequent port $S_2$ or $S_3$ receives an input because each subsequent port $S_2$ or $S_3$ connects to a mid-shift select line from shift driver 36 that produces a normalize mid-shift greater than the mid-shift of the exponent input into the port $D_1$ or $D_3$.

To ascertain whether shift driver 36 has enabled a select line producing a normalize mid-shift value greater than the exponent mid-shift value, each port $D_1$ and $D_2$ is OR'ed with its subsequent port $D_2$ and $D_3$. Specifically, port $D_1$ is OR'ed with ports $D_2$ and $D_3$ and port $D_2$ is OR'ed with port $D_3$. Essentially, by OR'ing each port $D_1$ and $D_2$ with its subsequent port $D_2$ and $D_3$, each port $S_2$ and $S_3$ that corresponds to one of the subsequent ports $D_2$ and $D_3$ will also correspond to a prior port $D_1$ and $D_2$. Port $D_3$ requires no OR'ing because only a normalize shift value of 12 will result in an underflow.

Consequently, multiplexer 103 determines if the normalize mid-shift value output from shift driver 36 exceeds the exponent mid-shift value output from decoder 77. Illustratively, when a mid-shift of 12 bits is required during normalization, shift driver 36 enables the select line that controls normalize shifter 35 to shift the ACB result 12 bits. As previously described, that select line also furnishes multiplexer 103 with an input at port $S_3$. If the exponent mid-shift value equals a shift of 4, decoder 77 enables the select line furnishing multiplexer 103 with an input at port $D_2$. Because port $D_2$ is OR'ed with port $D_3$, each of ports $S_2$ and $S_3$ corresponds to port $D_2$ such that, if either port $S_2$ or $S_3$ receives an input, multiplexer 103 furnishes an output indicating an underflow to answer adjust circuitry 39 through OR gate 106. Accordingly, since shift driver 36 enabled the select line producing a mid-shift of 12 bits, multiplexer 103 detects an underflow error because both port $D_2$ and port $S_3$ have received concurrent input signals which indicates the normalize mid-shift value exceeds the exponent mid-shift value. Alternatively, if shift driver 36 enabled either port $S_0$ or $S_1$, multiplexer 103 produces no output because the exponent mid-shift value exceeds the normalize mid-shift value.

If multiplexer 102 determines the normalize mid-shift value equals the exponent mid-shift value, the normalize minor shift value must be compared to the exponent minor shift value. Consequently, multiplexer 102 furnishes a signal that enables multiplexers 104 and 105. Once enabled, multiplexer 104 determines if the normalize minor shift value output from shift driver 36 during the normalization of the ACB result equals the exponent minor shift value determined by decoder 77. Multiplexer 104 includes ports $S_0$–$S_3$ that connect to a minor shift select line from shift driver 36. Specifically, port $S_0$ connects to the select line enabled to produce a shift of 0, port $S_1$ connects to the select line enabled to produce a shift of 1, port $S_2$ connects to the select line enabled to produce a shift of 2, and port $S_3$ connects to the select line enabled to produce a shift of 3.

Multiplexer 104 includes ports $D_0$–$D_3$ that connect to a minor shift select line from decoder 77. Specifically, port $D_0$ connects to the select line enabled if the minor shift for the exponent is 0, port $D_1$ connects to the select line enabled if the minor shift for the exponent is 1, port $D_2$ connects to the select line enabled if the minor shift for the exponent is 2, and port $D_3$ connects to the select line enabled if the minor shift for the exponent is 3.

In this preferred embodiment, multiplexer 104 is a 4 to 1 multiplexer that produces an output when one of ports $S_0$–$S_3$ and a corresponding one of ports $D_0$–$D_3$ both receive an input. For example, if port $S_2$ receives an input signal when port $D_2$ is also receiving an input signal, multiplexer 104 produces an output because ports $S_2$ and $D_2$ are corresponding ports. Conversely, if the inputs into multiplexer 104 occur at an S-port and a D-port that do not correspond, multiplexer 104 furnishes no output.

Consequently, multiplexer 104 determines if the normalize minor shift value output from shift driver 36 equals the exponent minor shift value output from decoder 77. Illustratively, when a minor shift of 2 bits is required during normalization, shift driver 36 enables the select line that controls normalize shifter 35 to shift the ACB result 2 bits. As previously described, that select line also furnishes multiplexer 104 with an input at port $S_2$. If the exponent minor shift value equals a shift of 2, decoder 77 enables the select line furnishing multiplexer 104 with an input at port $D_2$. Because ports $S_2$ and $D_2$ are corresponding ports receiving concurrent input signals, multiplexer 104 furnishes an output through OR gate 106 to answer adjust circuitry 39 indicating an underflow. Alternatively, if decoder 77 enabled any D-port other than $D_2$, multiplexer 104 provides no output because the normalize minor shift value does not equal the exponent minor shift value.

Once enabled, multiplexer 105 determines if the normalize minor shift value output from shift driver 36 during the normalization of the ACB result exceeds the exponent minor shift value determined by decoder 77. Multiplexer 105 is a 4 to 1 multiplexer identical to multiplexer 104. Multiplexer 105 includes ports $S_0$–$S_3$ that connect to a minor shift select line from shift driver 36 in exactly the same configuration as multiplexer 104.

Multiplexer 105 includes port $D_0$ that is grounded to prevent an incorrect output from multiplexer 105. Port $D_0$ is grounded because its corresponding port $S_0$ connects to the select line from shift driver 36 enabled to produce a minor shift of 0 during normalization. A minor shift of 0 for normalization will never exceed the exponent minor shift value determined by decoder 77. Consequently, when shift driver 36 enables the select line producing a minor shift of 0, multiplexer 105 must always provide no output signal. Grounding port $D_0$ ensures that multiplexer 105 furnishes no output whenever port $S_0$ provides multiplexer 105 with an input.

Multiplexer 105 includes ports $D_1$–$D_3$ that connect to a minor shift select line from decoder 77. Specifically, port $D_1$ connects to the select line enabled if the minor shift for the exponent is 0, port $D_2$ connects to the select line enabled if the minor shift for the exponent is 1, and port $D_3$ connects to the select line enabled if the minor shift for the exponent is 2. The select line enabled if the minor shift for the exponent is 3 is not connected to multiplexer 105 because no normalize minor shift value output from shift driver 36 will exceed an exponent minor shift value of 3. Consequently, if the exponent minor shift value equals 3, multiplexer 105 furnishes no output.

To determine if the normalize minor shift value exceeds the exponent shift value, ports $D_1$–$D_3$ each connect to a select line from decoder 77 enabled for an exponent minor shift value that is one shift level less than the normalize minor shift value input at a corresponding port $S_1$–$S_3$. For example, port $D_2$ connects to the select line enabled if the minor shift for the exponent is 1, however, its corresponding port $S_2$ connects to the select line enabled by shift driver 36 to produce a shift of 2. Thus, if port $D_2$ receives an input signal when port $S_2$ is also receiving an input signal, multiplexer 105 produces an output because ports $D_2$ and $S_2$ are corresponding ports and the normalize minor shift value exceeds the exponent minor shift value.

Furthermore, a port $D_1$–$D_3$ receiving an input from a select line enabled by decoder 77 must not only determine if its corresponding port $S_1$–$S_3$ is receiving an input signal, but the port $D_1$ or $D_2$ must also determine if any subsequent port $S_2$ or $S_3$ is receiving an input signal. A port $D_1$ or $D_2$ receiving an input from decoder 77 must determine if a subsequent port $S_2$ or $S_3$ receives an input because each subsequent port $S_2$ or $S_3$ connects to a minor shift select line from shift driver 36 that produces a normalize minor shift greater than the minor shift of the exponent input into the port $D_1$ or $D_3$.

To ascertain whether shift driver 36 has enabled a select line producing a normalize minor shift value greater than the exponent minor shift value, each port $D_1$ and $D_2$ is OR'ed with its subsequent port $D_2$ and $D_3$. Specifically, port $D_1$ is OR'ed with ports $D_2$ and $D_3$ and port $D_2$ is OR'ed with port $D_3$. Essentially, by OR'ing each port $D_1$ and $D_2$ with its subsequent port $D_2$ and $D_3$, each port $S_2$ and $S_3$ that corresponds to one of the subsequent ports $D_2$ and $D_3$ will also correspond to a prior port $D_1$ and $D_2$. Port $D_3$ requires no OR'ing because only a normalize shift value of 3 will result in an underflow.

Consequently, multiplexer 105 determines if the normalize minor shift value output from shift driver 36 exceeds the exponent minor shift value output from decoder 77. Illustratively, when a minor shift of 3 bits is required during normalization, shift driver 36 enables the select line that controls normalize shifter 35 to shift the ACB result 3 bits. As previously described, that select line also furnishes multiplexer 105 with an input at port $S_3$. If the exponent minor shift value equals a shift of 1, decoder 77 enables the select line furnishing multiplexer 105 with an input at port $D_2$. Because port $D_2$ is OR'ed with port $D_3$, each of ports $S_2$ and $S_3$ corresponds to port $D_2$ such that, if either port $S_2$ or $S_3$ receives an input, multiplexer 105 furnishes an output indicating an underflow to answer adjust circuitry 39 through OR gate 106. Accordingly, since shift driver 36 enabled the select line producing a minor shift of 3 bits, multiplexer 105 detects an underflow error because both port $D_2$ and port $S_3$ have received concurrent input signals which indicates the normalize minor shift value exceeds the exponent minor shift value. Alternatively, if shift driver 36 enabled either port $S_0$ or $S_1$, multiplexer 105 produces no output because the exponent minor shift value exceeds the normalize minor shift value.

Figure 7:
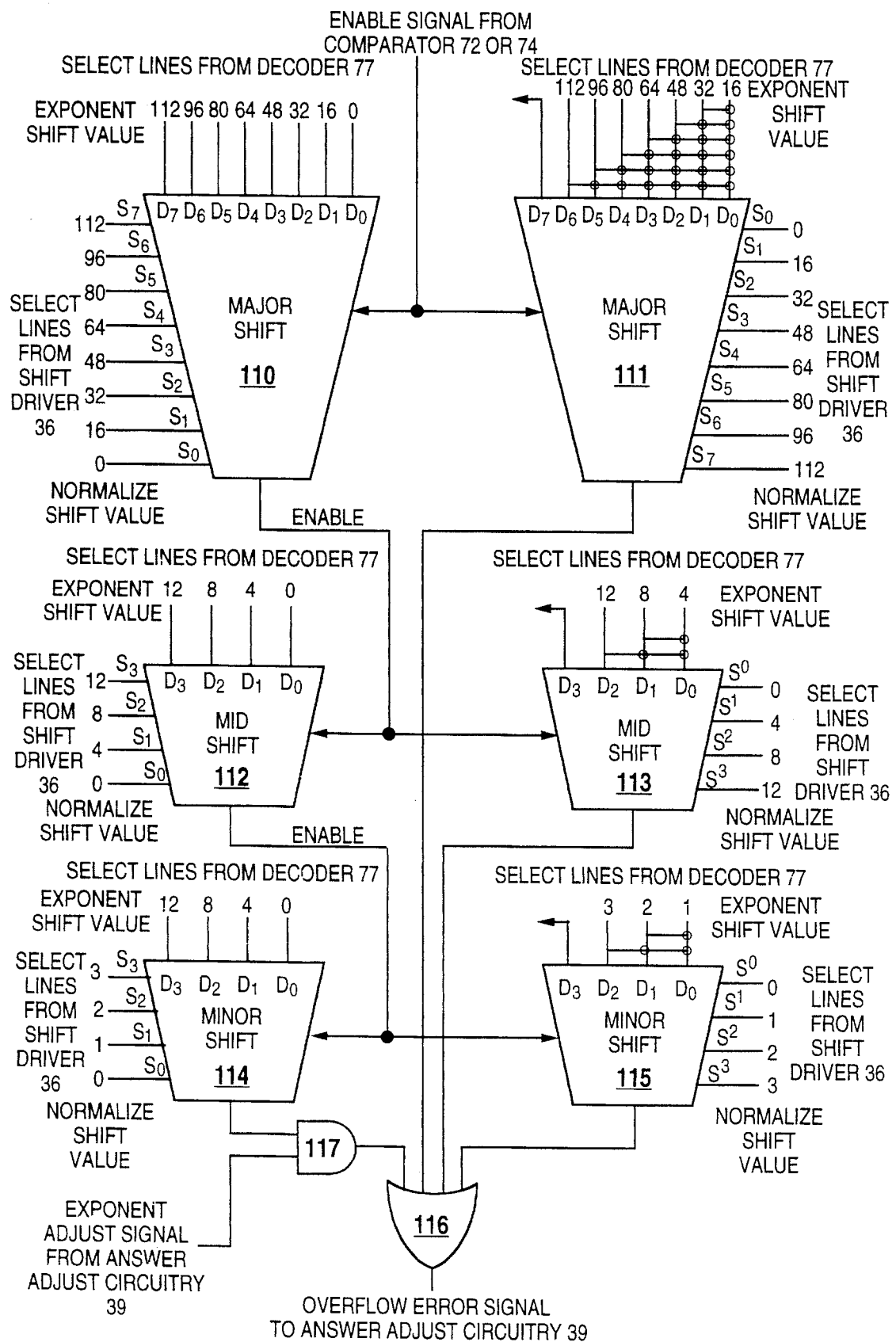
FIG. 7 is a block diagram illustrating the overflow shift value compare circuitry of the underflow/overflow detector.

As illustrated in FIG. 7, overflow shift value compare circuitry 79 includes multiplexers 110–115 to determine if an overflow error will occur during the normalization of the ACB result. The outputs of comparators 72 and 74 are connected to multiplexers 110 and 111 via OR gate 76. If either comparator 72 or 73 determines the exponent output from multiplexer 27 is positive and potentially might overflow, they output a signal that enables multiplexers 110 and 111 so that the positive exponent may be examined for an overflow error.

As previously described, the left shift performed by normalize shifter 35 during normalization manipulates the ACB result such that its exponent decreases by one for each shift produced from the normalize shift value. Consequently, a positive exponent output from multiplexer 27 will overflow if it has a numeric value greater than the number of shifts produced by the normalize shift value. Furthermore, an exponent having a numeric value equal to the number of shifts produced by the normalize shift value will overflow if the exponent must be incremented by answer adjust circuitry 39 as previously described. Thus, a comparison of positive exponents to the normalize shift value will determine overflow. However, floating point exponents cannot be directly compared to normalize shift values. Accordingly, decoder 77 offsets positive exponents and then decodes them into a major shift value, a mid-shift value, and a minor shift value that correspond to the normalize shift value that will cause an overflow to permit a comparison of positive exponents to normalize shift values.

Once enabled, multiplexer 110 determines if the normalize major shift value output from shift driver 36 during the normalization of the ACB result equals the exponent major shift value determined by decoder 77. Multiplexer 110 includes ports $S_0$–$S_7$ that connect to a major shift select line from shift driver 36. Specifically, port $S_0$ connects to the select line enabled to produce a shift of 0, port $S_1$ connects to the select line enabled to produce a shift of 16, port $S_2$ connects to the select line enabled to produce a shift of 32, port $S_3$ connects to the select line enabled to produce a shift of 48, port $S_4$ connects to the select line enabled to produce a shift of 64, port $S_5$ connects to the select line enabled to produce a shift of 80, port $S_6$ connects to the select line enabled to produce a shift of 96, and port $S_7$ connects to the select line enabled to produce a shift of 112. Multiplexer 110 inputs the normalize major shift values of 0, 16, 32, 38, 64, 80, 96, and 112 because decoder 77 only decodes the lower seven bits for a maximum exponent shift value of 127.

Multiplexer 110 includes ports $D_0$–$D_7$ that connect to a major shift select line from decoder 77. Specifically, port $D_0$ connects to the select line enabled if the major shift for the exponent is 0, port $D_1$ connects to the select line enabled if the major shift for the exponent is 16, port $D_2$ connects to the select line enabled if the major shift for the exponent is 32, port $D_3$ connects to the select line enabled if the major shift for the exponent is 48, port $D_4$ connects to the select line enabled if the major shift for the exponent is 64, port $D_5$ connects to the select line enabled if the major shift for the exponent is 80, port $D_6$ connects to the select line enabled if the major shift for the exponent is 96, and port $D_7$ connects to the select line enabled if the major shift for the exponent is 112.

In this preferred embodiment, multiplexer 110 is an 8 to 1 multiplexer that produces an output when one of ports $S_0$–$S_7$ and a corresponding one of ports $D_0$–$D_7$ both receive an input. For example, if port $S_4$ receives an input signal when port $D_4$ is also receiving an input signal, multiplexer 110 produces an output because ports $S_4$ and $D_4$ are corresponding ports. Conversely, if the inputs into multiplexer 110 occur at an S-port and a D-port that do not correspond, multiplexer 110 furnishes no output.

Consequently, multiplexer 110 determines if the normalize major shift value output from shift driver 36 equals the exponent major shift value output from decoder 77. Illustratively, when a major shift of 64 bits is required during normalization, shift driver 36 enables the select line that controls normalize shifter 35 to shift the ACB result 64 bits. As previously described, that select line also furnishes multiplexer 110 with an input at port $S_4$. If the exponent major shift value equals a shift of 64, decoder 77 enables the select line furnishing multiplexer 110 with an input at port $D_4$. Because ports $S_4$ and $D_4$ are corresponding ports receiving concurrent input signals, multiplexer 110 provides an output that enables multiplexers 102 and 103. Alternatively, if decoder 77 enabled any D-port other than $D_4$, multiplexer 110 provides no output and multiplexers 102 and 103 remain disabled.

Once enabled, multiplexer 111 determines if the normalize major shift value output from shift driver 36 during the normalization of the ACB result is less than the exponent major shift value determined by decoder 77. Multiplexer 111 is an 8 to 1 multiplexer identical to multiplexer 110. Multiplexer 111 includes ports $S_0$–$S_7$ that connect to a major shift select line from shift driver 36 in exactly the same configuration as multiplexer 110.

Multiplexer 111 includes port $D_7$ that is grounded to prevent an incorrect output from multiplexer 111. Port $D_7$ is grounded because its corresponding port $S_7$ connects to the select line from shift driver 36 enabled to produce a major shift of 112 for normalization. A major shift of 112 for normalization will never be less than the exponent major shift value determined by decoder 77. Consequently, when shift driver 36 enables the select line producing a major shift of 112, multiplexer 111 must always provide no output signal. Grounding port $D_7$ ensures that multiplexer 111 furnishes no output whenever port $S_7$ provides multiplexer 111 with an input.

Multiplexer 111 includes ports $D_0$–$D_6$ that connect to a major shift select line from decoder 77. Specifically, port $D_0$ connects to the select line enabled if the major shift for the exponent is 16, port $D_1$ connects to the select line enabled if the major shift for the exponent is 32, port $D_2$ connects to the select line enabled if the major shift for the exponent is 48, port $D_3$ connects to the select line enabled if the major shift for the exponent is 64, port $D_4$ connects to the select line enabled if the major shift for the exponent is 80, port $D_5$ connects to the select line enabled if the major shift for the exponent is 96, and port $D_6$ connects to the select line enabled if the major shift for the exponent is 112. The select line enabled if the major shift for the exponent is 0 is not connected to multiplexer 111 because no normalize major shift value output from shift driver 36 will be less than an exponent major shift value of 0. Consequently, if the exponent major shift value equals 0, multiplexer 111 furnishes no output.

To determine if the normalize major shift value exceeds the exponent shift value, ports $D_0$–$D_6$ each connect to a select line from decoder 77 enabled for an exponent major shift value that is one shift level more than the normalize major shift value input at a corresponding port $S_0$–S6. For example, port $D_4$ connects to the select line enabled if the major shift for the exponent is 80, however, its corresponding port $S_4$ connects to the select line enabled by shift driver 36 to produce a shift of 64. Thus, if port $D_4$ receives an input signal when port $S_4$ is also receiving an input signal, multiplexer 111 produces an output because ports $D_4$ and $S_4$ are corresponding ports and the normalize major shift value is less than the exponent major shift value.

Furthermore, a port $D_6$–$D_0$ receiving an input from a select line enabled by decoder 77 must not only determine if its corresponding port $S_6$–$S_0$ is receiving an input signal, but the port $D_6$–$D_0$ must also determine if any prior port $S_5$–$S_0$ is receiving an input signal. A port $D_6$–$D_0$ receiving an input from decoder 77 must determine if a prior port $S_5$–$S_0$ receives an input because each prior port $S_5$–$S_0$ connects to a major shift select line from shift driver 36 that produces a normalize major shift less than the major shift of the exponent input into the port $D_6$–$D_0$.

To ascertain whether shift driver 36 has enabled a select line producing a normalize major shift value greater than the exponent major shift value, each port $D_6$–$D_1$ is OR'ed with its prior port(s) $D_5$–$D_0$. Specifically, port $D_6$ is OR'ed with ports $D_5$–$D_0$, port $D_5$ is OR'ed with ports $D_4$–$D_0$, port $D_4$ is OR'ed with ports $D_3$–$D_0$, port $D_3$ is OR'ed with ports $D_2$–$D_0$, port $D_2$ is OR'ed with ports $D_1$ and $D_0$, and port $D_1$ is OR'ed with ports $D_0$. Essentially, by OR'ing each port $D_6$–$D_1$ with its prior port(s) $D_5$–$D_0$, each port $S_5$–$S_0$ that corresponds to one of the prior port(s) $D_5$–$D_0$ will also correspond to a subsequent port $D_6$–$D_1$. Port $D_0$ requires no OR'ing because only a normalize shift value of 0 will result in an overflow.

Consequently, multiplexer 111 determines if the normalize major shift value output from shift driver 36 is less than the exponent major shift value output from decoder 77. Illustratively, when a major shift of 32 bits is required during normalization, shift driver 36 enables the select line that controls normalize shifter 35 to shift the ACB result 32. As previously described, that select line also furnishes multiplexer 111 with an input at port $S_2$. If the exponent major shift value equals a shift of 80, decoder 77 enables the select line furnishing multiplexer 111 with an input at port $D_4$. Because port $D_4$ is OR'ed with ports $D_3$–$D_0$, each of ports $S_4$–$S_0$ corresponds to port $D_4$ such that, if any one of ports $S_4$–$S_0$ receives an input, multiplexer 111 furnishes an output indicating an overflow to answer adjust circuitry 39 through OR gate 116. Accordingly, since shift driver 36 enabled the select line producing a major shift of 32 bits, multiplexer 111 detects an overflow error because both port $D_4$ and port $S_2$ have received concurrent input signals which indicates the normalize major shift value is less than the exponent major shift value. Alternatively, if shift driver 36 enabled any one of ports $S_5$–$S_7$, multiplexer 111 produces no output because the normalize major shift value exceeds the exponent major shift value.

If multiplexer 110 determines the normalize major shift value equals the exponent major shift value, the normalize mid-shift value must be compared to the exponent mid-shift value. Consequently, multiplexer 110 furnishes a signal that enables multiplexers 112 and 113. Once enabled, multiplexer 112 determines if the normalize mid-shift value output from shift driver 36 during the normalization of the ACB result equals the exponent mid-shift value determined by decoder 77. Multiplexer 112 includes ports $S_0$–$S_3$ that connect to a mid-shift select line from shift driver 36. Specifically, port $S_0$ connects to the select line enabled to produce a shift of 0, port $S_1$ connects to the select line enabled to produce a shift of 4, port $S_2$ connects to the select line enabled to produce a shift of 8, and port $S_3$ connects to the select line enabled to produce a shift of 12.

Multiplexer 112 includes ports $D_0$–$D_3$ that connect to a mid-shift select line from decoder 77. Specifically, port $D_0$ connects to the select line enabled if the mid-shift for the exponent is 0, port $D_1$ connects to the select line enabled if the mid-shift for the exponent is 4, port $D_2$ connects to the select line enabled if the mid-shift for the exponent is 8, and port $D_3$ connects to the select line enabled if the mid-shift for the exponent is 12.

In this preferred embodiment, multiplexer 112 is a 4 to 1 multiplexer that produces an output when one of ports $S_0$–$S_3$ and a corresponding one of ports $D_0$–$D_3$ both receive an input. For example, if port $S_2$ receives an input signal when port $D_2$ is also receiving an input signal, multiplexer 112 produces an output because ports $S_2$ and $D_2$ are corresponding ports. Conversely, if the inputs into multiplexer 112 occur at an S-port and a D-port that do not correspond, multiplexer 112 furnishes no output.

Consequently, multiplexer 112 determines if the normalize mid-shift value output from shift driver 36 equals the exponent mid-shift value output from decoder 77. Illustratively, when a mid-shift of 8 bits is required during normalization, shift driver 36 enables the select line that controls normalize shifter 35 to shift the ACB result 8 bits. As previously described, that select line also furnishes multiplexer 112 with an input at port $S_2$. If the exponent mid-shift value equals a shift of 8, decoder 77 enables the select line furnishing multiplexer 112 with an input at port $D_2$. Because ports $S_2$ and $D_2$ are corresponding ports receiving concurrent input signals, multiplexer 112 provides an output that enables multiplexers 104 and 105. Alternatively, if decoder 77 enabled any D-port other than $D_2$, multiplexer 112 provides no output and multiplexers 104 and 105 remain disabled.

Once enabled, multiplexer 113 determines if the normalize mid-shift value output from shift driver 36 during the normalization of the ACB result is less than the exponent mid-shift value determined by decoder 77. Multiplexer 113 is a 4 to 1 multiplexer identical to multiplexer 112. Multiplexer 113 includes ports $S_0$–$S_3$ that connect to a mid-shift select line from shift driver 36 in exactly the same configuration as multiplexer 112.

Multiplexer 113 includes port $D_3$ that is grounded to prevent an incorrect output from multiplexer 113. Port $D_3$ is grounded because its corresponding port $S_3$ connects to the select line from shift driver 36 enabled to produce a mid-shift of 12 during normalization. A mid-shift of 12 for normalization will never be less than the exponent mid-shift value determined by decoder 77. Consequently, when shift driver 36 enables the select line producing a mid-shift of 12, multiplexer 113 must always provide no output signal. Grounding port $D_3$ ensures that multiplexer 113 furnishes no output whenever port $S_3$ provides multiplexer 113 with an input.

Multiplexer 113 includes ports $D_2$–$D_0$ that connect to a mid-shift select line from decoder 77. Specifically, port $D_2$ connects to the select line enabled if the mid-shift for the exponent is 12, port $D_1$ connects to the select line enabled if the mid-shift for the exponent is 8, and port $D_0$ connects to the select line enabled if the mid-shift for the exponent is 4. The select line enabled if the mid-shift for the exponent is 0 is not connected to multiplexer 113 because no normalize mid-shift value output from shift driver 36 will be less than an exponent mid-shift value of 0. Consequently, if the exponent mid-shift value equals 0, multiplexer 113 furnishes no output.

To determine if the normalize mid-shift value exceeds the exponent shift value, ports $D_2$–$D_0$ each connect to a select line from decoder 77 enabled for an exponent mid-shift value that is one shift level greater than the normalize mid-shift value input at a corresponding port $S_2$–$S_0$. For example, port $D_2$ connects to the select line enabled if the mid-shift for the exponent is 12, however, its corresponding port $S_2$ connects to the select line enabled by shift driver 36 to produce a shift of 8. Thus, if port $D_2$ receives an input signal when port $S_2$ is also receiving an input signal, multiplexer 113 produces an output because ports $D_2$ and $S_2$ are corresponding ports and the normalize mid-shift value is less than the exponent mid-shift value.

Furthermore, a port $D_2$–$D_0$ receiving an input from a select line enabled by decoder 77 must not only determine if its corresponding port $S_2$–$S_0$ is receiving an input signal, but the port $D_2$ or $D_1$ must also determine if any prior port $S_1$ or $S_0$ is receiving an input signal. A port $D_2$ or $D_1$ receiving an input from decoder 77 must determine if a prior port $S_1$ or $S_0$ receives an input because each prior port $S_1$ or $S_0$ connects to a mid-shift select line from shift driver 36 that produces a normalize mid-shift less than the mid-shift of the exponent input into the port $D_2$ or $D_1$.

To ascertain whether shift driver 36 has enabled a select line producing a normalize mid-shift value greater than the exponent mid-shift value, each port $D_2$ and $D_1$ is OR'ed with its prior port $D_1$ and $D_0$. Specifically, port $D_2$ is OR'ed with ports $D_1$ and $D_0$ and port $D_1$ is OR'ed with port $D_0$. Essentially, by OR'ing each port $D_2$ and $D_1$ with its prior port $D_1$ and $D_0$, each port $S_1$ and $S_0$ that corresponds to one of the prior ports $D_1$ and $D_0$ will also correspond to a subsequent port $D_2$ and $D_1$. Port $D_0$ requires no OR'ing because only a normalize shift value of 0 will result in an overflow.

Consequently, multiplexer 113 determines if the normalize mid-shift value output from shift driver 36 exceeds the exponent mid-shift value output from decoder 77. Illustratively, when a mid-shift of 0 bits is required during normalization, shift driver 36 enables the select line that controls normalize shifter 35 to shift the ACB result 0 bits. As previously described, that select line also furnishes multiplexer 113 with an input at port $S_0$. If the exponent mid-shift value equals a shift of 8, decoder 77 enables the select line furnishing multiplexer 113 with an input at port $D_1$. Because port $D_1$ is OR'ed with port $D_0$, each of ports $S_1$ and $S_0$ corresponds to port $D_1$ such that, if either port $S_1$ or $S_0$ receives an input, multiplexer 113 furnishes an output indicating an overflow to answer adjust circuitry 39 through OR gate 116. Accordingly, since shift driver 36 enabled the select line producing a mid-shift of 0 bits, multiplexer 113 detects an overflow error because both port $D_1$ and port $S_0$ have received concurrent input signals which indicates the exponent mid-shift value exceeds the normalize mid-shift value Alternatively, if shift driver 36 enabled either port $S_2$ or $S_3$, multiplexer 113 produces no output because the normalize mid-shift value exceeds the exponent mid-shift value.

If multiplexer 112 determines the normalize mid-shift value equals the exponent mid-shift value, the normalize minor shift value must be compared to the exponent minor shift value. Consequently, multiplexer 112 furnishes a signal that enables multiplexers 114 and 115. Once enabled, multiplexer 114 determines if the normalize minor shift value output from shift driver 36 during the normalization of the ACB result equals the exponent minor shift value determined by decoder 77. Multiplexer 114 includes ports $S_0$–S3 that connect to a minor shift select line from shift driver 36. Specifically, port $S_0$ connects to the select line enabled to produce a shift of 0, port $S_1$ connects to the select line enabled to produce a shift of 1, port $S_2$ connects to the select line enabled to produce a shift of 2, and port $S_3$ connects to the select line enabled to produce a shift of 3.

Multiplexer 114 includes ports $D_0$–$D_3$ that connect to a minor shift select line from decoder 77. Specifically, port $D_0$ connects to the select line enabled if the minor shift for the exponent is 0, port $D_1$ connects to the select line enabled if the minor shift for the exponent is 1, port $D_2$ connects to the select line enabled if the minor shift for the exponent is 2, and port $D_3$ connects to the select line enabled if the minor shift for the exponent is 3.

In this preferred embodiment, multiplexer 114 is a 4 to 1 multiplexer that produces an output when one of ports $S_0$–$S_3$ and a corresponding one of ports $D_0$14 $D_3$ both receive an input. For example, if port $S_2$ receives an input signal when port $D_2$ is also receiving an input signal, multiplexer 114 produces an output because ports $S_2$ and $D_2$ are corresponding ports. Conversely, if the inputs into multiplexer 114 occur at an S-port and a D-port that do not correspond, multiplexer 114 furnishes no output.

Consequently, multiplexer 114 determines if the normalize minor shift value output from shift driver 36 equals the exponent minor shift value output from decoder 77. Illustratively, when a minor shift of 2 bits is required during normalization, shift driver 36 enables the select line that controls normalize shifter 35 to shift the ACB result 2 bits. As previously described, that select line also furnishes multiplexer 114 with an input at port $S_2$. If the exponent minor shift value equals a shift of 2, decoder 77 enables the select line furnishing multiplexer 114 with an input at port $D_2$. Because ports $S_2$ and $D_2$ are corresponding ports receiving concurrent input signals, multiplexer 114 furnishes an output to AND gate 117 indicating the normalize shift value equals the exponent shift value. Alternatively, if decoder 77 enabled any D-port other than $D_2$, multiplexer 114 provides no output because the normalize minor shift value does not equal the exponent minor shift value.

Although no overflow occurs when the exponent major, mid, and minor shift values equal the normalize major, mid, and minor shift values, multiplexers provide that information because, if the exponent shift value equals the normalize shift value, an increment of the exponent in answer adjust circuitry 39 as previously described with reference to FIG. 1 will create an overflow error. Consequently, AND gate 117 AND's the output from multiplexer 114 with the exponent adjust signal developed within answer adjust circuitry 39 to determine if an overflow error will occur. If answer adjust circuitry 39 determines that the exponent must be incremented, an overflow error will occur because, when the exponent shift value equals the normalize shift value, the exponent equals the maximum permissible positive exponent. Consequently, if the exponent is incremented, an overflow error will occur. In that instance, AND gate 117 outputs an overflow error signal through OR gate 116 to answer adjust circuitry 39.

Once enabled, multiplexer 115 determines if the normalize minor shift value output from shift driver 36 during the normalization of the ACB result is less than the exponent minor shift value determined by decoder 77. Multiplexer 115 is a 4 to 1 multiplexer identical to multiplexer 114. Multiplexer 115 includes ports $S_0$–$S_3$ that connect to a minor shift select line from shift driver 36 in exactly the same configuration as multiplexer 114.

Multiplexer 115 includes port $D_3$ that is grounded to prevent an incorrect output from multiplexer 115. Port $D_3$ is grounded because its corresponding port $S_3$ connects to the select line from shift driver 36 enabled to produce a minor shift of 3 during normalization. A minor shift of 3 for normalization will never be less than the exponent minor shift value determined by decoder 77. Consequently, when shift driver 36 enables the select line producing a minor shift of 3, multiplexer 115 must always provide no output signal. Grounding port $D_3$ ensures that multiplexer 115 furnishes no output whenever port $S_3$ provides multiplexer 115 with an input.

Multiplexer 115 includes ports $D_2$–$D_0$ that connect to a minor shift select line from decoder 77. Specifically, port $D_2$ connects to the select line enabled if the minor shift for the exponent is 3, port $D_1$ connects to the select line enabled if the minor shift for the exponent is 2, and port $D_0$ connects to the select line enabled if the minor shift for the exponent is 1. The select line enabled if the minor shift for the exponent is 0 is not connected to multiplexer 115 because no normalize minor shift value output from shift driver 36 will be less than an exponent minor shift value of 0. Consequently, if the exponent minor shift value equals 0, multiplexer 115 furnishes no output.

To determine if the normalize minor shift value exceeds the exponent shift value, ports $D_2$–$D_0$ each connect to a select line from decoder 77 enabled for an exponent minor shift value that is one shift level greater than the normalize minor shift value input at a corresponding port $S_2$–$S_0$. For example, port $D_2$ connects to the select line enabled if the minor shift for the exponent is 3, however, its corresponding port $S_2$ connects to the select line enabled by shift driver 36 to produce a shift of 2. Thus, if port $D_2$ receives an input signal when port $S_2$ is also receiving an input signal, multiplexer 115 produces an output because ports $D_2$ and $S_2$ are corresponding ports and the normalize minor shift value is less than the exponent minor shift value.

Furthermore, a port $D_2$–$D_0$ receiving an input from a select line enabled by decoder 77 must not only determine if its corresponding port $S_2$–$S_0$ is receiving an input signal, but the port $D_2$ or $D_1$ must also determine if any prior port $S_1$ or $S_0$ is receiving an input signal. A port $D_2$ or $D_1$ receiving an input from decoder 77 must determine if a prior port $S_1$ or $S_0$ receives an input because each prior port $S_1$ or $S_0$ connects to a minor shift select line from shift driver 36 that produces a normalize minor shift less than the minor shift of the exponent input into the port $D_2$ or $D_1$.

To ascertain whether shift driver 36 has enabled a select line producing a normalize minor shift value greater than the exponent minor shift value, each port $D_2$ and $D_1$ is OR'ed with its prior port $D_1$ and $D_0$. Specifically, port $D_2$ is OR'ed with ports $D_1$ and $D_0$ and port $D_1$ is OR'ed with port $D_0$. Essentially, by OR'ing each port $D_2$ and $D_1$ with its prior port $D_1$ and $D_0$, each port $S_1$ and $S_0$ that corresponds to one of the prior ports $D_1$ and $D_0$ will also correspond to a subsequent port $D_2$ and $D_1$. Port $D_0$ requires no OR'ing because only a normalize shift value of 0 will result in an overflow.

Consequently, multiplexer 115 determines if the normalize minor shift value output from shift driver 36 exceeds the exponent minor shift value output from decoder 77. Illustratively, when a minor shift of 0 bits is required during normalization, shift driver 36 enables the select line that controls normalize shifter 35 to shift the ACB result 0 bits. As previously described, that select line also furnishes multiplexer 115 with an input at port $S_0$. If the exponent minor shift value equals a shift of 2, decoder 77 enables the select line furnishing multiplexer 115 with an input at port $D_1$. Because port $D_1$ is OR'ed with port $D_0$, each of ports $S_1$ and $S_0$ corresponds to port $D_1$ such that, if either port $S_1$ or $S_0$ receives an input, multiplexer 115 furnishes an output indicating an overflow to answer adjust circuitry 39 through OR gate 116. Accordingly, since shift driver 36 enabled the select line producing a minor shift of 0 bits, multiplexer 115 detects an overflow error because both port $D_1$ and port $S_0$ have received concurrent input signals which indicates the exponent minor shift value exceeds the normalize minor shift value. Alternatively, if shift driver 36 enabled either port $S_2$ or $S_3$, multiplexer 115 produces no output because the normalize minor shift value exceeds the exponent minor shift value.

As previously indicated, those skilled in the art will recognize that shift value compare circuitry 51 which includes multiplexers 100–105 and 110–115 may be utilized to detect underflow and overflow errors when the B exponent exceeds the AC exponent. To accomplish that detection, the only required modification is the outputting of the B exponent to shift value compare circuitry 51 even when that exponent exceeds the AC exponent. Decoder 77 and comparators 70–74 will process the B exponent identically to provide an exponent shift value and the enablement of the correct multiplexers 100 and 101 or 110 and 111. Furthermore, each of multiplexers 100–105 and 110–115 will process both the normalize shift value and the exponent shift value identically to determine if an underflow or overflow error will occur.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not limited in any respect by the foregoing description, rather, it is defined only by the claims that follow.

We claim:

1. An apparatus for detecting whether a result of a floating point arithmetic operation underflows or overflows, comprising:

first circuitry for decoding the exponent of the result into an exponent shift value; and second circuitry for comparing the exponent shift value with a normalize shift value required to normalize the mantissa of the result and for outputting a signal indicating whether the result underflows or overflows.

2. The apparatus according to claim 1 further comprising third circuitry for comparing the exponent of the result to a maximum and minimum exponent value.

3. The apparatus according to claim 2 wherein said third circuitry comprises circuitry for determining whether the exponent exceeds or equals the maximum double precision exponent value.

4. The apparatus according to claim 2 wherein said third circuitry comprises circuitry for determining whether the exponent exceeds or equals the maximum single precision exponent value.

5. The apparatus according to claim 2 wherein said third circuitry comprises circuitry for determining whether the exponent is less than or equal to the minimum exponent value.

6. The apparatus according to claim 1 wherein said first circuitry comprises decoder circuitry for decoding the exponent of the result into the exponent shift value.

7. The apparatus according to claim 1 wherein said second circuitry comprises single precision circuitry for determining whether the exponent is positive, negative, or zero.

8. The apparatus according to claim 7 wherein said second circuitry comprises double precision circuitry for determining whether the exponent potentially might overflow or potentially might underflow.

9. The apparatus according to claim 8 wherein said second circuitry comprises underflow detection circuitry enabled by said single precision circuitry when the exponent is negative or zero or by said double precision circuitry when the exponent might potentially underflow for comparing the exponent shift value to the normalize shift value to determine if an underflow error will occur.

10. The apparatus according to claim 9 wherein said underflow detection circuitry, comprises:

first multiplexer circuitry for determining if the normalize shift value equals the exponent shift value; and second multiplexer circuitry for determining if the normalize shift value exceeds the exponent shift value.

11. The apparatus according to claim 8 wherein said second circuitry comprises overflow detection circuitry enabled by said single precision circuitry when the exponent is positive or by said double precision circuitry when the exponent might potentially overflow for comparing the exponent shift value to the normalize shift value to determine if an overflow error will occur.

12. The apparatus according to claim 11 wherein said overflow detection circuitry, comprises:

first multiplexer circuitry for determining if the normalize shift value equals the exponent shift value; and second multiplexer circuitry for determining if the normalize shift value is less than the exponent shift value.

13. A method of detecting whether a result of a floating point arithmetic operation underflows or overflows, comprising the steps decoding the exponent of the result into an exponent shift value;

comparing the exponent shift value to a normalize shift value required to normalize the mantissa of the result; and outputting a signal indicating whether the result underflows or overflows.

14. The method according to claim 13 further comprising the step of comparing the exponent to a maximum and minimum exponent value.

15. The method according to claim 14 wherein the step of comparing the exponent to a maximum and minimum exponent value comprises the step of determining whether the exponent exceeds or equals the maximum double precision exponent value.

16. The method according to claim 14 wherein the step of comparing the exponent to a maximum and minimum exponent value comprises the step of determining whether the exponent exceeds or equals the maximum single precision exponent value.

17. The method according to claim 14 wherein the step of comparing the exponent to a maximum and minimum exponent value comprises the step of determining whether the exponent is less than or equal to the minimum exponent value for both single and double precision.

18. The method according to claim 13 wherein the step of comparing the exponent shift value to a normalize shift value comprises the step of determining whether the exponent is positive, negative, or zero.

19. The method according to claim 18 wherein the step of comparing the exponent shift value to a normalize shift value comprises the step of determining whether the exponent potentially might overflow or potentially might underflow.

20. The method according to claim 19 wherein the step of comparing the exponent shift value to a normalize shift value comprises the steps in response to the determination that the exponent is negative or zero or the determination that the exponent potentially might underflow:

multiplexing the exponent shift value and the normalize shift value to determine if the normalize shift equals the exponent shift value; and multiplexing the exponent shift value and the normalize shift value to determine if the normalize shift exceeds the exponent shift value.

21. The method according to claim 19 wherein the step of comparing the exponent shift value to a normalize shift value comprises the steps of:

in response to the determination that the exponent is positive or the determination that the exponent potentially might overflow:

multiplexing the exponent shift value and the normalize shift value to determine if the normalize shift equals the exponent shift value; and multiplexing the exponent shift value and the normalize shift value to determine if the normalize shift is less than the exponent shift value.

* * * * *